US012158545B2

(12) United States Patent
Zhang et al.

(10) Patent No.: US 12,158,545 B2
(45) Date of Patent: *Dec. 3, 2024

(54) LIDAR SYSTEMS AND METHODS WITH BEAM STEERING AND WIDE ANGLE SIGNAL DETECTION

(71) Applicant: Innovusion, Inc., Sunnyvale, CA (US)

(72) Inventors: Rui Zhang, Palo Alto, CA (US); Yimin Li, Cupertino, CA (US); Junwei Bao, Los Altos, CA (US); Jim Li, Los Altos, CA (US)

(73) Assignee: SEYOND, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,541

(22) Filed: Jan. 23, 2023

(65) Prior Publication Data

US 2023/0161012 A1    May 25, 2023

Related U.S. Application Data

(63) Continuation of application No. 16/737,365, filed on Jan. 8, 2020, now Pat. No. 11,675,055.

(60) Provisional application No. 62/790,842, filed on Jan. 10, 2019.

(51) Int. Cl.
*G01C 3/08*    (2006.01)
*G01S 7/481*    (2006.01)
*G01S 7/483*    (2006.01)
*G01S 17/10*    (2020.01)

(52) U.S. Cl.
CPC ............ *G01S 7/4817* (2013.01); *G01S 7/483* (2013.01); *G01S 17/10* (2013.01)

(58) Field of Classification Search
CPC ......... G01S 7/4817; G01S 7/483; G01S 17/10
See application file for complete search history.

(56) References Cited

U.S. PATENT DOCUMENTS

| | | |
|---|---|---|
| 3,897,150 A | 7/1975 | Bridges et al. |
| 4,412,720 A | 11/1983 | Costa |
| 4,464,048 A | 8/1984 | Farlow |
| 5,006,721 A | 4/1991 | Cameron et al. |
| 5,157,451 A | 10/1992 | Taboada et al. |
| 5,303,084 A | 4/1994 | Pflibsen et al. |
| 5,319,434 A | 6/1994 | Croteau et al. |

(Continued)

FOREIGN PATENT DOCUMENTS

| | | |
|---|---|---|
| AU | 4604493 A | 12/1993 |
| CN | 1662789 A | 8/2005 |

(Continued)

OTHER PUBLICATIONS

"Mirrors", Physics LibreTexts, https://phys.libretexts.org/Bookshelves/Optics/Supplemental_Modules_(Components)/ Mirrors, (2021), 2 pages.

(Continued)

*Primary Examiner* — Adam M Alharbi
(74) *Attorney, Agent, or Firm* — MASCHOFF BRENNAN; Liang Huang

(57) ABSTRACT

Embodiments discussed herein refer to using LiDAR systems for steering consecutive light pulses using micro electro-mechanical system (MEMS) to illuminate objects in a field of view. Embodiments discussed herein also refer to using a multiple lens array to process returned light pulses.

31 Claims, 28 Drawing Sheets

(56) References Cited

U.S. PATENT DOCUMENTS

| | | | |
|---|---|---|---|
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,788,445 B2 | 9/2004 | Goldberg et al. |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di et al. |
| 7,489,865 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,879,990 B2 | 1/2018 | Klepsvik et al. |
| 9,880,278 B2 | 1/2018 | Uffelen et al. |
| 9,880,283 B2 | 1/2018 | Droz et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,031,214 B2 | 7/2018 | Rosenzweig et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,084,925 B2 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 2002/0136251 A1 | 9/2002 | Green et al. |
| 2002/0196424 A1 | 12/2002 | Sano et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0026008 A1 | 2/2011 | Gammenthaler |
| 2011/0181864 A1 | 7/2011 | Schmitt et al. |
| 2012/0038903 A1* | 2/2012 | Weimer .............. G01C 3/08 250/208.2 |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |

(56) References Cited

U.S. PATENT DOCUMENTS

| | | |
|---|---|---|
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0329044 A1 | 11/2015 | Bernstein et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0100928 A1 | 4/2018 | Keilaf et al. |
| 2018/0113200 A1* | 4/2018 | Steinberg ............. B60Q 1/0023 |
| 2018/0152691 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0341009 A1 | 11/2018 | Niclass et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383515 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0309917 A1 | 10/2020 | Kudla et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | | | |
|---|---|---|---|---|
| CN | 1677050 A | 10/2005 | | |
| CN | 101105389 A | 1/2008 | | |
| CN | 101923163 A | 12/2010 | | |
| CN | 201749187 U | 2/2011 | | |
| CN | 103675796 A | 3/2014 | | |
| CN | 204758260 U | 11/2015 | | |
| CN | 204885804 U | 12/2015 | | |
| CN | 206331115 U | 7/2017 | | |
| CN | 108132472 A | 6/2018 | | |
| CN | 207457508 U | 6/2018 | | |
| CN | 207557465 U | 6/2018 | | |
| CN | 208314210 U | 1/2019 | | |
| CN | 208421228 U | 1/2019 | | |
| CN | 208705506 U | 4/2019 | | |
| CN | 106597471 B | 5/2019 | | |
| CN | 209280923 U | 8/2019 | | |
| CN | 108445468 B | 11/2019 | | |
| CN | 110031823 B | 3/2020 | | |
| CN | 108089201 B | 4/2020 | | |
| CN | 109116331 B | 4/2020 | | |
| CN | 109917408 B | 4/2020 | | |
| CN | 109116366 B | 5/2020 | | |
| CN | 109116367 B | 5/2020 | | |
| CN | 110031822 B | 5/2020 | | |
| CN | 111328376 A * | 6/2020 | ............. | G01S 17/08 |
| CN | 211655309 U | 10/2020 | | |
| CN | 109188397 B | 11/2020 | | |
| CN | 109814086 B | 11/2020 | | |
| CN | 109917348 B | 11/2020 | | |
| CN | 110492856 B | 11/2020 | | |
| CN | 110736975 B | 11/2020 | | |
| CN | 109725320 B | 12/2020 | | |
| CN | 110780284 B | 12/2020 | | |
| CN | 110780283 B | 1/2021 | | |
| CN | 110784220 B | 2/2021 | | |
| CN | 212623082 U | 2/2021 | | |
| CN | 110492349 B | 3/2021 | | |
| CN | 109950784 B | 5/2021 | | |
| CN | 213182011 U | 5/2021 | | |
| CN | 213750313 U | 7/2021 | | |
| CN | 214151038 U | 9/2021 | | |
| CN | 109814082 B | 10/2021 | | |
| CN | 113491043 A | 10/2021 | | |
| CN | 214795200 U | 11/2021 | | |
| CN | 214795206 U | 11/2021 | | |
| CN | 214895784 U | 11/2021 | | |
| CN | 214895810 U | 11/2021 | | |
| CN | 215641806 U | 1/2022 | | |
| CN | 112639527 B | 2/2022 | | |
| CN | 215932142 U | 3/2022 | | |
| CN | 112578396 B | 4/2022 | | |
| DE | 112015001704 T5 | 12/2016 | | |
| DE | 102015213558 A1 | 1/2017 | | |
| EP | 0 757 257 B1 | 2/1997 | | |
| EP | 1 237 305 A2 | 9/2002 | | |
| EP | 1480057 A2 | 11/2004 | | |
| EP | 1 923 721 A1 | 5/2008 | | |
| EP | 2 157 445 A2 | 2/2010 | | |
| EP | 2 395 368 A1 | 12/2011 | | |
| EP | 2 889 642 A1 | 7/2015 | | |
| GB | 1 427 164 A | 3/1976 | | |
| GB | 2000411 | 1/1979 | | |
| JP | 2003004850 A | 1/2003 | | |
| JP | 2007144667 | 6/2007 | | |
| JP | 2010035385 A | 2/2010 | | |
| JP | 2012026921 A | 2/2012 | | |
| JP | 2017-003347 A | 1/2017 | | |
| JP | 2017-138301 A | 8/2017 | | |
| KR | 20090058866 A | 6/2009 | | |
| KR | 10-2012-0013515 A | 2/2012 | | |
| KR | 10-2013-0068224 A | 6/2013 | | |
| KR | 10-2018-0107673 A | 10/2018 | | |
| KR | 20180127599 A | 11/2018 | | |
| KR | 101925816 B1 | 12/2018 | | |
| WO | 2017/110417 A1 | 6/2017 | | |
| WO | 2018/125725 A1 | 7/2018 | | |
| WO | 2018/129410 A1 | 7/2018 | | |

(56) References Cited

FOREIGN PATENT DOCUMENTS

| WO | 2018129408 A1 | 7/2018 |
|---|---|---|
| WO | 2018129409 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

"Why Wavelengths Matter in Fiber Optics", FirstLight, https://www.firstlight.net/why-wavelengths-matter-in-fiber-optics/, (2021), 5 pages.
"'Forego' vs. 'Forgo': The E Is Important," Merriam-Webster, https://www.merriam-webster.com/words-at-play/usage-of-forego-vs-forgo, 11 pages.
Oike, Y. et al. "High-speed and High-accuracy Position Sensor for 3-D Measurement Using Row Parallel Processing on the Sensor Plane," ITE Technical Report, 2001, vol. 25.55, 25.55, Session ID IPU2001-76, pp. 83-88, Released on J-STAGE Jun. 23, 2017, Online ISSN 2424-1970, Print ISSN 1342-6893, https://doi.org/10.11485/itetr.25.55.0_83, https://www.jstage.jst.go.jp/article/itetr/25.55/0/25.55_83/_article/-char/en, 6 pages.
Office Action Issued in German Application No. 11 2020 000 407.4 dated Feb. 13, 2023, 40 pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS- OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
Office Action issued in Chinese Application No. 202080007059.7 dated Feb. 24, 2024, 42 pages.
Qikun, et al. "Design on omnidirectional optical system of lidar based on 2D MEMS mirror," Journal of Applied Optics, vol. 39 No. 4, Jul. 2018, 6 pages.

\* cited by examiner

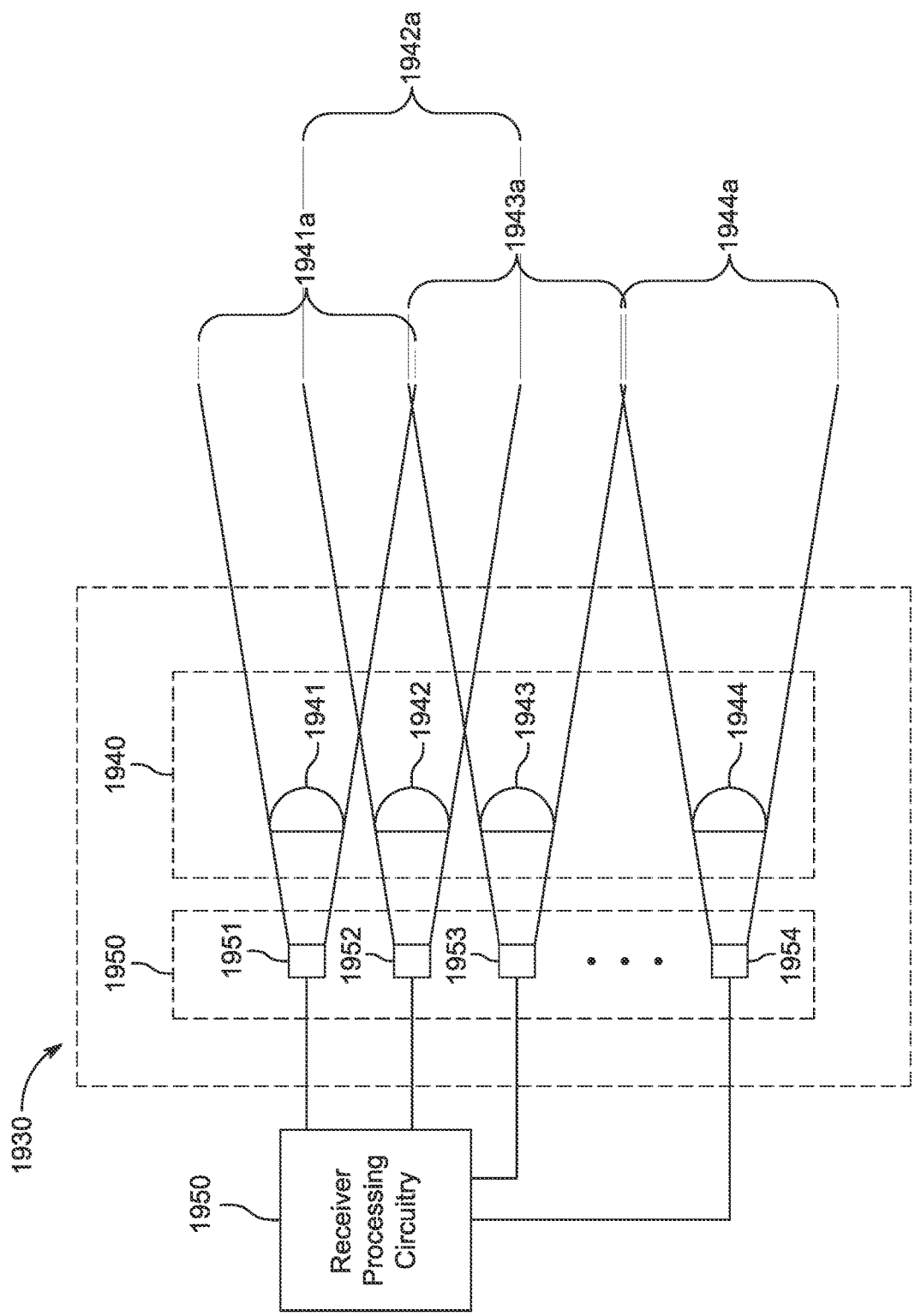

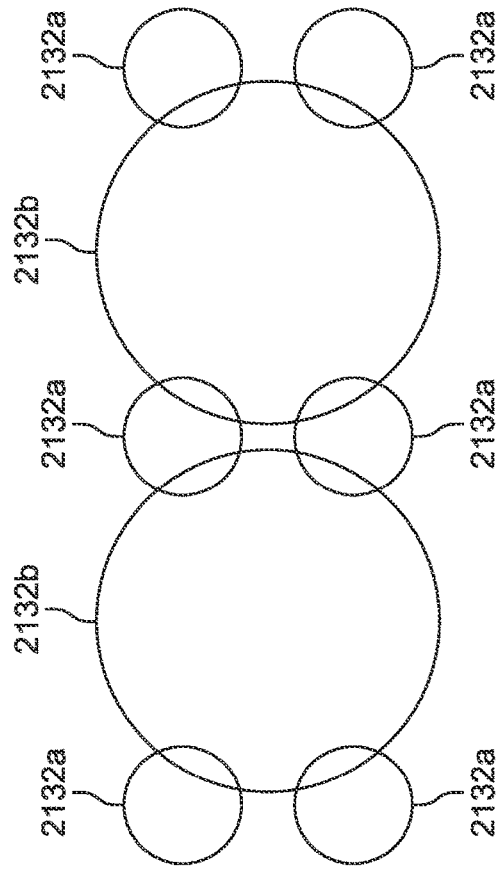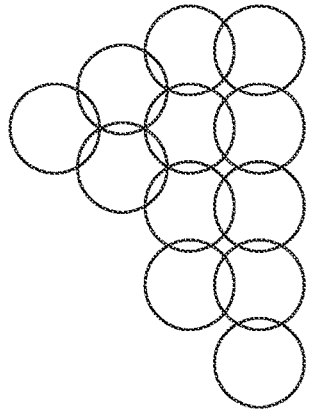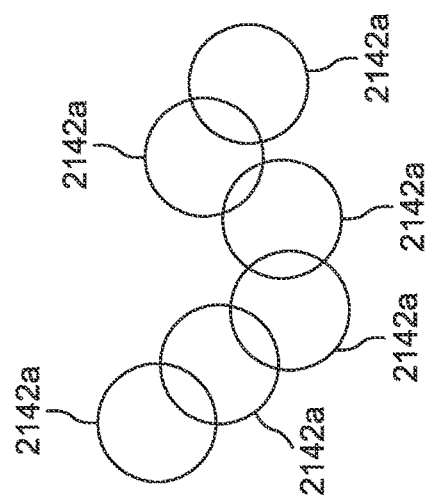

LIDAR SYSTEMS AND METHODS WITH BEAM STEERING AND WIDE ANGLE SIGNAL DETECTION

This application is a continuation of U.S. Non-Provisional application Ser. No. 16/737,365 filed Jan. 8, 2020, which claims the benefit of U.S. Provisional Application No. 62/790,842 filed Jan. 10, 2019. The entire contents of these applications are hereby incorporated herein by reference in their entireties for all purposes.

FIELD OF THE INVENTION

The present disclosure relates generally to light detection and ranging (LiDAR) systems and methods and, more particularly, to systems and methods for steering consecutive light pulses using micro electro-mechanical system (MEMS) to illuminate objects in a field of view.

BACKGROUND

LiDAR system can be used to measure the distance between an object and the system. Specifically, the system can transmit a signal (e.g., using a light source), record a returned signal (e.g., using light detectors), and determine the distance by calculating the delay between the returned signal and the transmitted signal.

BRIEF SUMMARY

The following presents a simplified summary of one or more examples in order to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

Embodiments discussed herein refer to using LiDAR systems for steering consecutive light pulses using micro electro-mechanical system (MEMS) or other beam steering systems to illuminate objects in a field of view. Returned light pulses can be detected using different receiver systems. One such receiver system may use a relatively large optic in combination with a detector array. Another receiver system may use multiple optics in combination with multiple detectors.

In one embodiment, a LiDAR system can include a beam steering system, a laser system operative to emit light pulses that are steered by the beam steering system such that each emitted light pulse is steered along an optical path within a field of view (FOV), and receiver system operative to receive return pulses from the FOV. The beam steering system can include a micro-electrical mechanical system (MEMS) structure and a mirror. The receiver system can include an optical lens and a detector array comprising a plurality of detector segments. The LiDAR system can include control circuitry operative to activate a subset of the detector segments based on the optical path; deactivate the detector segments not included within the subset; and process a return pulse detected by the activated subset of detector segments.

In one embodiment, the MEMS structure is a MEMS polygon.

In one embodiment, the MEMS structure is a liquid crystal.

In one embodiment, the MEMS structure includes at least one micro mirror.

In one embodiment, the optical lens is a wide angle lens.

In one embodiment, the detector array is positioned at or near a focal plane of the optical lens.

In one embodiment, the control circuitry is operative to register the optical path with the selective activation of the subset of detector segments such that only the subset of detector segments is active to receive the return pulse.

In one embodiment, a deactivated detector segment is powered off and wherein an activated detector segment is powered on.

In one embodiment, the beam steering system does not direct the return pulse to the detector array.

In one embodiment, the controller is operative to control a repetition rate of the light pulses based on the optical path.

In one embodiment, the controller is operative to adjust the movement speed of the mirror based on the optical path.

In one embodiment, the controller is operative to coordinate at least one of movement speed of the mirror and a repetition rate of the light pulses based on the optical path.

In one embodiment, a method for using a LiDAR scanning system is provided that includes controlling, via a beam steering system, transmission of a light pulse along an optical path within a field of view (FOV), the beam steering system comprising a micro-electrical mechanical system (MEMS) structure; activating a subset of detector segments of a detector array comprising a plurality of detector segments based on the optical path; deactivating the detector segments not included in the activated subset; monitoring the activated subset of detector segments for a return pulse; and processing the monitored return pulse.

In one embodiment, the beam steering system comprises a mirror.

In one embodiment, the method further includes receiving a return pulse from the FOV, wherein the return pulse is collected by an optical lens that directs the return pulse to the activated subset of detector segments.

In one embodiment, the optical lens is a wide angle lens.

In one embodiment, the detector array is positioned at or near a focal plane of the optical lens.

In one embodiment, the MEMS structure is a MEMS polygon.

In one embodiment, the MEMS structure is a liquid crystal.

In one embodiment, the MEMS structure comprises at least one micro mirror.

In one embodiment, the method further includes registering the optical path with the selective activation of the subset of detector segments such that only the subset of detector segments is active to receive the return pulse.

In one embodiment, a deactivated detector segment is powered off and wherein an activated detector segment is powered on.

In one embodiment, the beam steering system does not direct the return pulse to the detector array.

In one embodiment, the method further includes controlling a repetition rate of the light pulses based on the optical path.

In one embodiment, the method further includes adjusting movement speed of a mirror included in the beam steering system based on the optical path.

In one embodiment, the method further includes coordinating at least one of movement speed of a mirror included in the beam steering system and a repetition rate of the light pulses based on the optical path.

In one embodiment, a LiDAR system is provided that includes a beam steering system, a laser system operative to emit light pulses that are steered by the beam steering system such that each emitted light pulse is steered along an optical path within a field of view (FOV), a receiver system operative to receive return pulses from the FOV, and control circuitry. The beam steering system can include a micro-electrical mechanical system (MEMS) structure and a mirror. The receiver system can include a multi-lens array comprising a plurality of lenses each associated with a window within the FOV, wherein at least two windows overlap each other such that the lenses associated with the overlapping windows receive the same return pulse; and a plurality of detectors, each one of the plurality of detectors corresponding to one of the plurality of lenses. The control circuitry is operative to process signals received from each of the plurality of detectors, and discriminate among the processed signals by filtering out received return pulses that are not captured by the at least two overlapping windows to produce a filtered signal.

In one embodiment, the MEMS structure is a MEMS polygon.

In one embodiment, the MEMS structure is a liquid crystal.

In one embodiment, the MEMS structure comprises at least one micro mirror.

In one embodiment, the at least two windows overlap each other at a minimum distance within the FOV.

In one embodiment, a LiDAR system is provided that includes a beam steering system; a laser system operative to emit light pulses that are steered by the beam steering system such that each emitted light pulse is steered along an optical path within a field of view (FOV); and a receiver system operative to receive return pulses from the FOV. The receiver system can include a multi-lens array comprising a plurality of lenses each associated with a window within the FOV, wherein at least two windows overlap each other such that the lenses associated with the overlapping windows receive the same return pulse; and a plurality of detectors, each one of the plurality of detectors corresponding to one of the plurality of lenses. The LiDAR system can include control circuitry operative to process signals received from each of the plurality of detectors; and discriminate among the processed signals by filtering out received return pulses that are not captured by the at least two overlapping windows to produce a filtered signal.

In one embodiment, a method for a LiDAR system is provided that includes controlling, via a beam steering system, transmission of a light pulse along an optical path within a field of view (FOV); receiving returned light pulses from the FOV via a multi-lens array comprising a plurality of lenses each associated with a window within the FOV, wherein at least two windows overlap each other such that the lenses associated with the overlapping windows receive the same returned light pulse, and wherein each of the plurality of lenses directs any returned light pulse to a detector corresponding to that particular one of the plurality of lenses; processing signals received from each detector corresponding to the plurality of lenses; and discriminating among the processed signals by filtering out received return pulses that are not captured by the at least two overlapping windows to produce a filtered signal.

In one embodiment, a LiDAR system is provided that includes a laser transmission and steering system operative to transmit light pulses along transmission paths within a field of view (FOV); and a receiver system operative to receive return pulses from the FOV, wherein at least one of the return pulses is received along a reception path that is not the same as any of the transmission paths. The receiver system includes a plurality of optical lens and detector combinations (ODC), each ODC associated with a reception path, and wherein at least two ODCs process a return pulse from the same object within the FOV. The LiDAR system can include control circuitry operative to filter out received return pulses that do not correspond to the same object being processed by the at least two ODCs.

In one embodiment, all of the return pulses are received along reception paths that are not the same as any of the transmission paths.

In one embodiment, each ODC comprises an optical lens and a detector.

In one embodiment, a LiDAR system further includes a vehicle, wherein the light pulses are transmitted from a first location on the vehicle, wherein each of the plurality of ODCs are located at respective different locations on the vehicle other than the first location.

A further understanding of the nature and advantages of the embodiments discussed herein may be realized by reference to the remaining portions of the specification and the drawings.

BRIEF DESCRIPTION OF THE DRAWINGS

FIG. 20 shows an illustrative diagram of multi-lens array according to an embodiment.

FIGS. 21A, 21B, 21C, 21D, 21E, and 21F show different window arrangements that are derived from a corresponding multi-lens array according to various embodiments.

DETAILED DESCRIPTION

Figure 1:
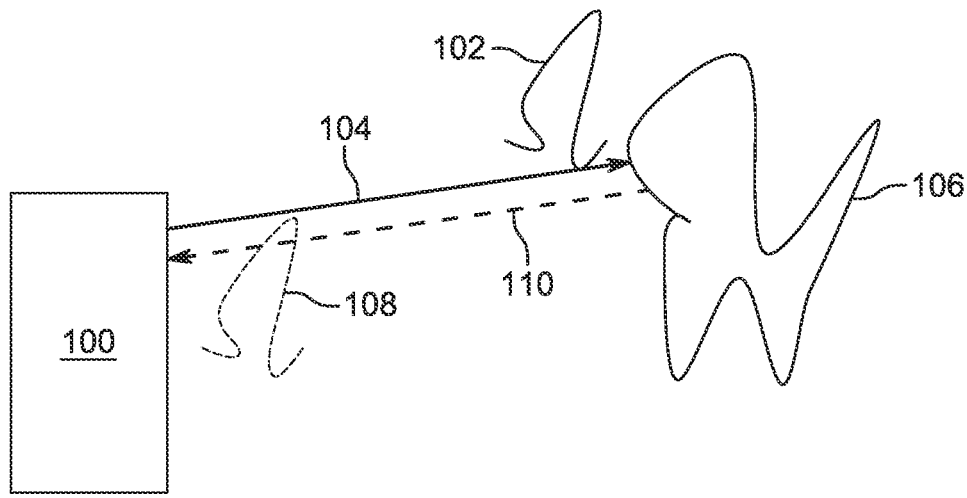
FIGS. 1-3 illustrate an exemplary LiDAR system using pulse signal to measure distances to points in the outside environment.

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Some light detection and ranging (LiDAR) systems use a single light source to produce one or more light signals of a single wavelength that scan the surrounding environment. The signals are scanned using steering systems that direct the pulses in one or two dimensions to cover an area of the surrounding environment (the scan area). Many different types of steering systems can be used to direct light pulses within the FOV. For example, the steering system can include MEMS, a mechanical phase array, an optical phase array, or other suitable system.

For example, some embodiments of the present technology use one or more light sources that produce light signals of different wavelengths and/or along different optical paths. These light sources provide the signals to a signal steering system at different angles so that the scan areas for the light signals are different (e.g., if two light sources are used to create two light signals, the scan area associated with each light source is different). This allows for tuning the signals to appropriate transmit powers and the possibility of having overlapping scan areas that cover scans of different distances. Longer ranges can be scanned with signals having higher power and/or slower repetition rate (e.g., when using pulsed light signals). Shorter ranges can be scanned with signals having lower power and/or high repetition rate (e.g., when using pulse light signals) to increase point density.

As another example, some embodiments of the present technology use signal steering systems with one or more dispersion elements (e.g., gratings, optical combs, prisms, etc.) to direct pulse signals based on the wavelength of the pulse. A dispersion element can make fine adjustments to a pulse's optical path, which may be difficult or impossible with mechanical systems. Additionally, using one or more dispersion elements allows the signal steering system to use fewer mechanical components to achieve the desired scanning capabilities. This results in a simpler, more efficient (e.g., lower power) design that is potentially more reliable (due to fewer moving components).

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed can be used to derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
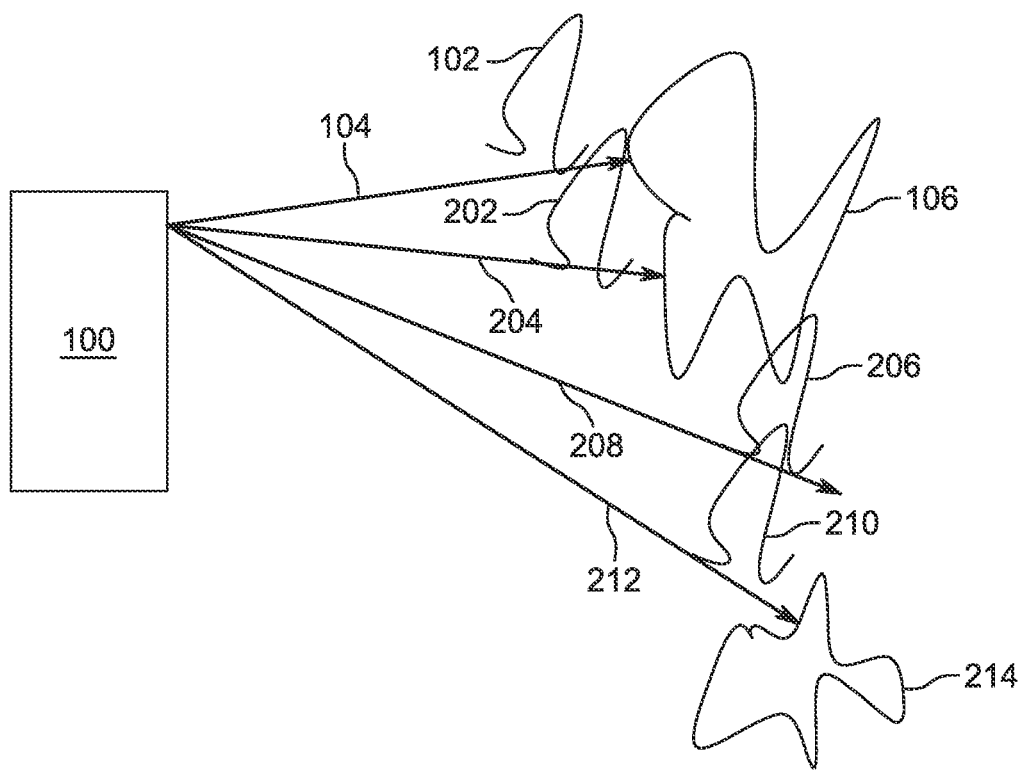
Figure 3:
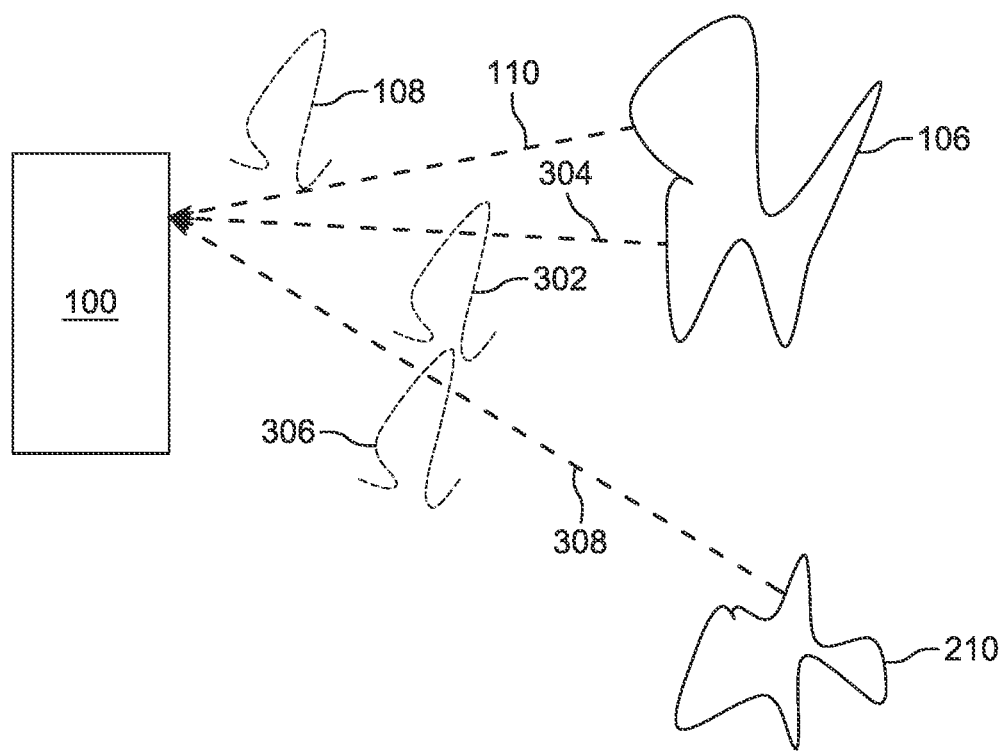

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects that can scatter sufficient amount of signal for the LiDAR light pulse within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 Mhz (and thus improving the density of points of the system) would significantly reduce the detection range of the system.

Figure 4:
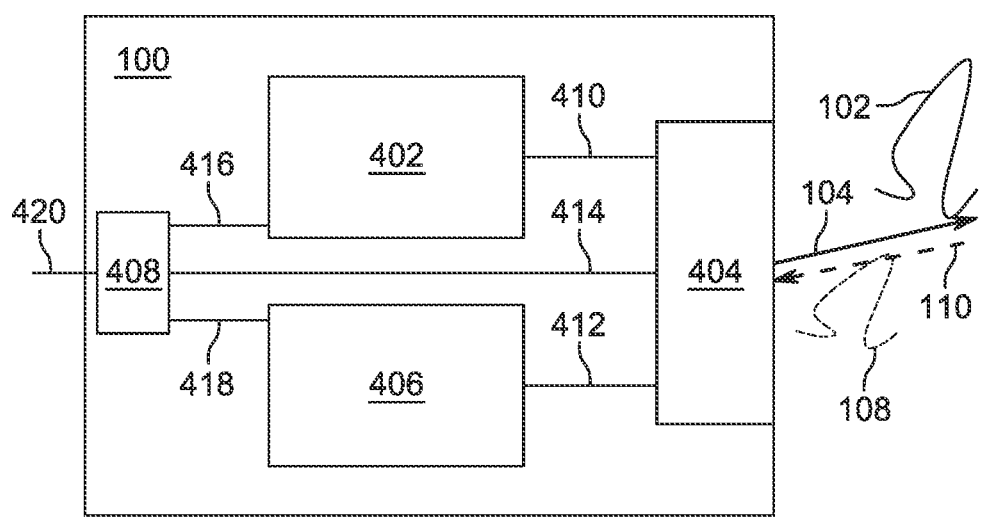
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Figure 5:
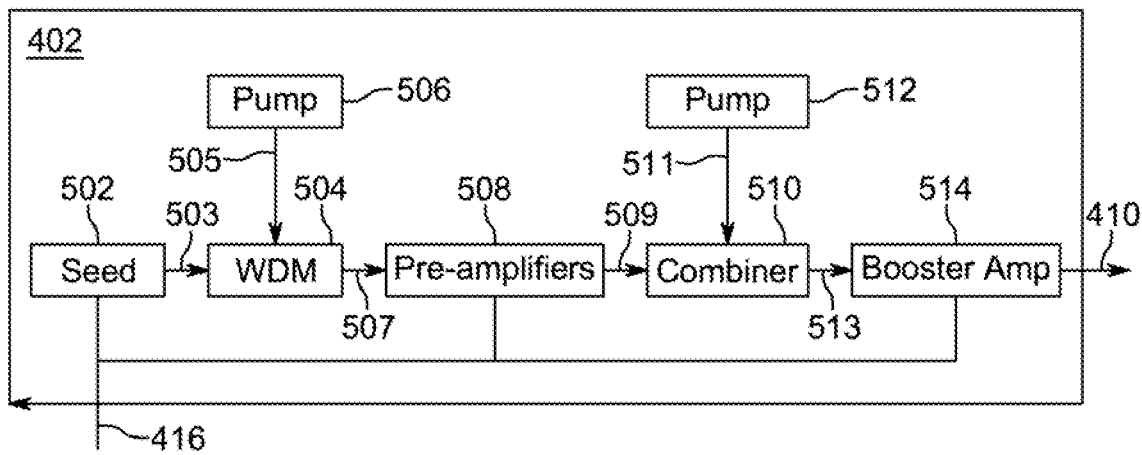
FIG. 5 depicts a light source of the exemplary LiDAR system.

FIG. 5 depicts a logical block diagram of one example of light source 402 that is based on a fiber laser, although any number of light sources with varying architecture could be used as part of the LiDAR system. Light source 402 uses seed 502 to generate initial light pulses of one or more wavelengths (e.g., 1550 nm), which are provided to wavelength-division multiplexor (WDM) 504 via fiber 503. Pump 506 also provides laser power (of a different wavelength, such as 980 nm) to WDM 504 via fiber 505. The output of WDM 504 is provided to pre-amplifiers 508 (which includes one or more amplifiers) which provides its output to combiner 510 via fiber 509. Combiner 510 also takes laser power from pump 512 via fiber 511 and provides pulses via fiber 513 to booster amplifier 514, which produces output light pulses on fiber 410. The outputted light pulses are then fed to steering system 404. In some variations, light source 402 can produce pulses of different amplitudes based on the fiber gain profile of the fiber used in the source. Communication path 416 couples light source 402 to controller 408 (FIG. 4) so that components of light source 402 can be controlled by or otherwise communicate with controller 408. Alternatively, light source 402 may include its own controller. Instead of controller 408 communicating directly with components of light source 402, a dedicated light source controller communicates with controller 408 and controls and/or communicates with the components of light source 402. Light source 402 also includes other components not shown, such as one or more power connectors, power supplies, and/or power lines.

Some other light sources include one or more laser diodes, short-cavity fiber lasers, solid-state lasers, and/or tunable external cavity diode lasers, configured to generate one or more light signals at various wavelengths. In some examples, light sources use amplifiers (e.g., pre-amps or booster amps) include a doped optical fiber amplifier, a solid-state bulk amplifier, and/or a semiconductor optical amplifier, configured to receive and amplify light signals.

Returning to FIG. 4, signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). An example signal steering system is described in U.S. Patent Application Publication No. 2018/0188355, entitled "2D Scanning High Precision LiDAR Using Combination of Rotating Concave Mirror and Beam Steering Devices," the content of which is incorporated by reference in its entirety herein for all purposes. In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Figure 6:
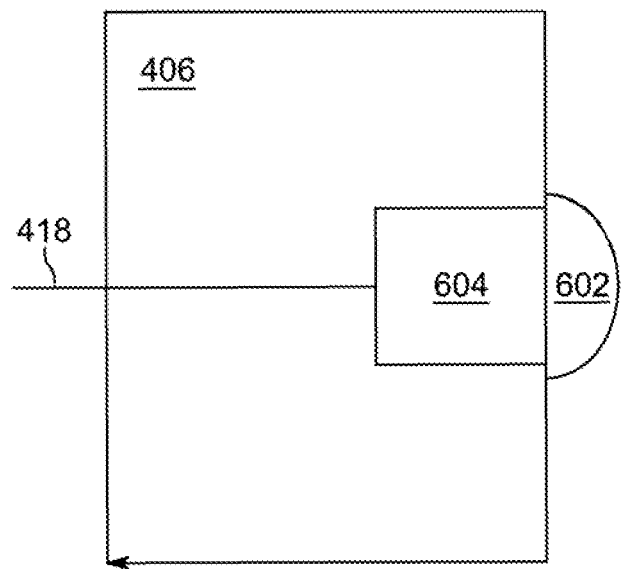
FIG. 6 depicts a light detector of the exemplary LiDAR system.

FIG. 6 depicts a logical block diagram of one possible arrangement of components in light detector 406 of LiDAR system 100 (FIG. 4). Light detector 406 includes optics 602 (e.g., a system of one or more optical lenses) and detector array 604 (e.g., one or more charge coupled devices (CCD), photodiodes, avalanche photodiodes, a photomultiplier vacuum tube, an image sensor, etc.) that is connected to controller 408 (FIG. 4) via communication path 418. The optics 602 may include one or more photo lenses to receive, focus, and direct the returned signals. Light detector 406 can include filters to selectively pass light of certain wavelengths. Light detector 406 can also include a timing circuit that measures the time from when a pulse is transmitted to when a corresponding returned pulse is detected. This data can then be transmitted to controller 408 (FIG. 4) or to other devices via communication line 418. Light detector 406 can also receive information about when light source 402 transmitted a light pulse via communication line 418 or other communications lines that are not shown (e.g., an optical fiber from light source 402 that samples transmitted light pulses). Alternatively, light detector 406 can provide signals via communication line 418 that indicate when returned light pulses are detected. Other pulse data, such as power, pulse shape, and/or wavelength, can also be communicated.

Returning to FIG. 4, controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 7:
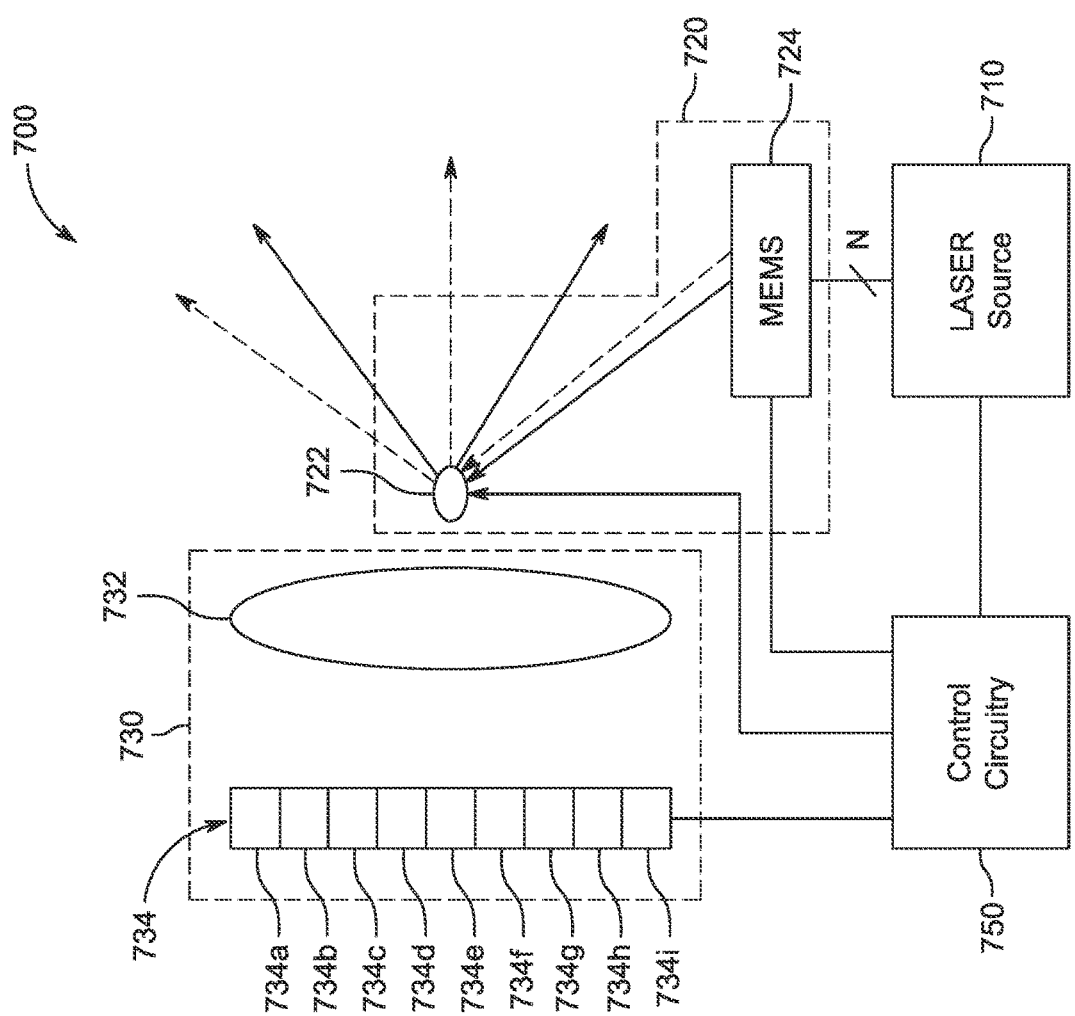
FIG. 7 shows an illustrative MEMS based LiDAR system according to an embodiment.

FIG. 7 shows an illustrative MEMS based LiDAR system 700 according to an embodiment. System 700 can include laser source 710, beam steering system 720, which may include galvo system 722 and MEMS steering unit 724, receiver system 730, which include receiving optic 732 and detector array 734, and control circuitry 750. In operation, light pulses from laser source 710 are directed to MEMS 724, which redirects the light pulses to galvo system 722, which then redirects the lights pulses to the FOV. If desired one or more light beams originate from laser source 710. For example, an originating laser beam may be split to provide two or more beams (shown here as the solid line and the dashed line). Returned pulses (not shown) are collected by optic 732 and directed to detector array 734. Detector array 734 senses the returned light pulse and provides a signal corresponding to the returned signal to control circuitry 750. Laser source 710 can be similar to laser 402, discussed above. Beam steering system 720 is able to direct light pulses provided by laser source 710 to a location within a field of view (FOV) of system 700. MEMS steering unit 724 may be responsible for a first axis sweep (e.g., vertical axis) within the FOV and galvo 722 may be responsible for controlling a second axis sweep (e.g., horizontal axis) within the FOV and galvo 722 may be a mirror. In some embodiments, galvo 722 may be single plane mirror such as that shown in FIG. 11A or a dual plane mirror such as that shown in FIG. 11B.

MEMS steering system 724 may be a liquid crystal, a miniaturized rotating polygon, or any other suitable MEMS based component that can control direction of the light beam. In some embodiments, MEMS steering system 724 can include a MEMS device that uses micro-mirrors. The MEMS mirror can steer the laser generated by the laser source in two or three dimensions to illuminate objects in a field of view. It is appreciated that MEMS beam steering system 724 can also include other MEMS components such as optical switches, optical cross-connects, lens, etc. Use of a MEMS steering system is desirable in that such solutions reduce the size of the LiDAR system, which can translate to less power consumption, smaller packaging, and less cost. In some embodiment, a MEMS steering system can have an optical aperture cross-section that it is on the order of a few millimeters or less (e.g., less than 5 mm). The relatively small optical cross-section is suitable for broadcasting light beams to the FOV, but is not suitable for redirecting return pulses to receiver system 730. That is, in contrast with system that has a relatively large optical aperture cross-section, a MEMS steering system may not be large enough to "collect" and redirect returned pulses to a receiver system. To compensate for the relatively small size of MEMS steering system 724, optic 732 may be sized relatively large to collect returned pulses and focus them to detector array 734. For example, in one embodiment, optic 732 may be a fisheye lens or other optic with a relatively wide acceptance angle. A fisheye lens can be a wide-angle lens that produces visual distortion intended to create a wide panoramic or hemispherical image. Thus, the fisheye lens can collect scattered light within a wide-angle, thereby enhancing or increasing the visibility of the LiDAR system. A fisheye lens can be, for example, a circular fisheye lens or a full-frame fisheye lens. In some embodiments, the fisheye lens's field of view can be selected or configured to match the field of view of the MEMS beam steering range. The fisheye wide angle receiving lens can be coupled to MEMS beam steering system 724, for example, side by side.

Detector array 734 may include a 1×N array of detector segments or an N×M array of detector segments, where N and M are integers. The detector segments can be implemented using an InGaAs-based detector or a SiGe-based detector. Detector array 734 includes several detector segments, as opposed to a single detector arrangement, because the optical cross-section of MEMS steering system 724 requires that multiple detector segments be used in combination with optic 732 in order to detect returned light signals. However, use of detector array 734 (as opposed to single discrete detector) will increase detection of noise (e.g., background light), thus potentially hampering returned light pulse detection. More particularly, because a relatively large light collecting optic is being used in conjunction with detector array 734, the overall size of detector array 734 may be relatively large compared to the size of the returning light pulse. For example, the returning light pulse may be on the order micrometers, whereas the cross-sectional area of detector array 734 may be on the order of millimeters. As such, the return beam size is considerably smaller than the area of the entire detector array 734. This may significantly increase detector noise and reduce signal-to-noise ratio because any portion of detector array 734 that is not processing a returned light beam is generating noise by picking background light and radiation. Moreover, detector array 734 uses a multi-segmented array of detectors, as opposed to a single large detector. Use of a relatively large area detector (e.g., a big non-segmented detector such as detector 734) may also introduce a large junction capacitance, which is proportional to the area of the detector. A large junction capacitance is undesired as it may slow down operation of components (e.g., an amplifier) and contributes to excess noise gain.

Figures 8, 8A:
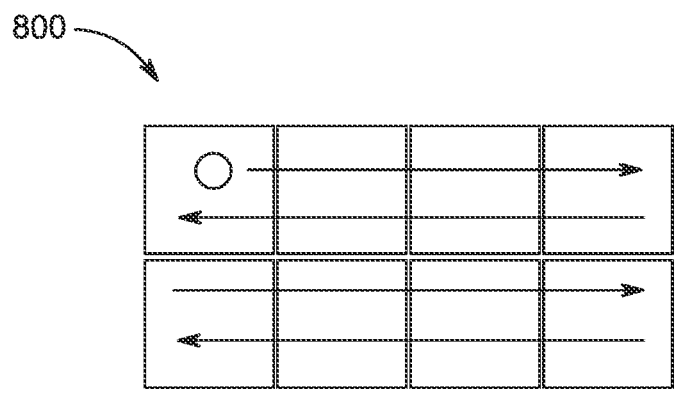
FIGS. 8, 8A, and 8B illustrate exemplary multi-segmented detectors according to various embodiments.

FIG. 8 illustrates an exemplary multi-segmented detector 800 according to an embodiment. Multi-segmented detector 800 shows multiple small segments 820 arranged in a 2×4 array. Also shown is a returned light signal (e.g., shown as a spot) to illustrate the relatively small size of the returned light signal compared to the overall size of multi-segmented detector 800. By segmenting detector 800 into multiple segments, the smaller junction capacitance can be made smaller compared to that of an equivalently sized single detector.

FIG. 8A illustrates another exemplary multi-segmented detector 820 according to an embodiment. Detector 820 is arranged in a 9×9 grid composed of nine 3×3 subgrids. As shown, each subgrid includes nine (9) segments 1-9. Each segment is rectangular in shape, and the entirety of multi-segmented detector 820 can be rectangular. Similarly numbered segments may all be interconnected with each other. For example, all segments labeled one (1) are connected, and all segments labeled two (2) are connected, and so on. The multi-segmented detector array can be a silicon based detector, or InGaAs based detector, or a SiGe based detector.

Figure 8B:
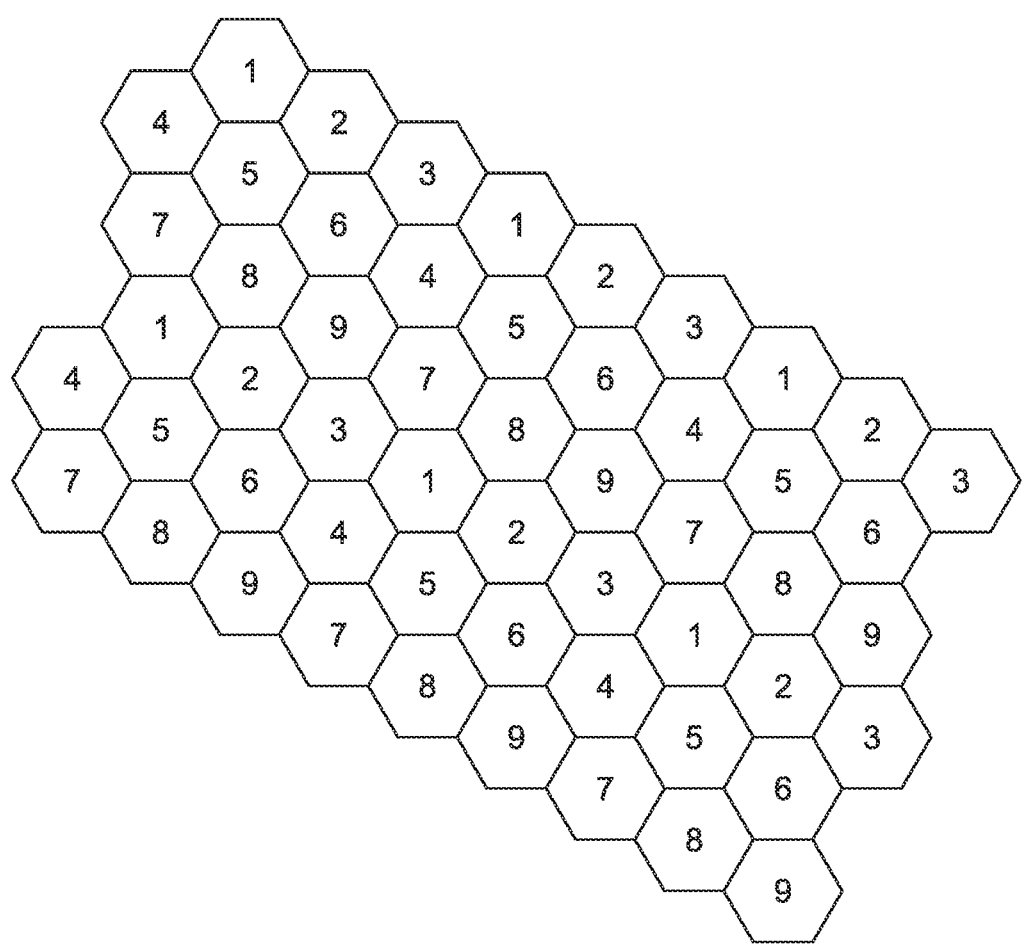

FIG. 8B illustrates yet another exemplary multi-segmented detector 840 according to an embodiment. Detector 840 is composed of several six-sided polygon segments arranged in a honeycomb-like pattern. Similarly numbered segments are interconnected with each other.

Referring now back to FIG. 7, detector array 734 is shown to be segmented into segments 734a-734i. The number of segments and arrangement thereof is merely illustrative. During operation of LiDAR system 700, when a return light signal is received, a subset of segments 734a-734i (e.g., just one of the segments) may detect that returned signal. Each returned light signal corresponds to its beam steering angle or position as directed by MEMS beam steering system 724. Since the beam steering angle is known, the return angle of the return light pulse is also known. With this knowledge, the system knows which subset of segments 734a-734i should receive the returned light signal. Control circuitry 750 can selectively activate the subset of segments 734a-734i based on a registration with MEMS steering system 724 and/or galvo 722. This way, only the necessary segments are active for monitoring for a returned signal and the other segment are deactivated (to conserve power and reduce noise). Control circuitry 750 has knowledge of galvo 722 position and MEMS steering system 724 position, and thus is able to selectively activate and deactivate segments 734a-734i based on the positioning of galvo 722 and MEMS steering system 724. By selectively activating a subset of detectors and deactivating other detectors, junction capacitance of a detector can be significantly reduced and in turn, the signal-to-noise ratio can be improved. In addition, selective activation and deactivation of segments saves power and improves thermal management of the system. Moreover, since only the necessary subset of segments is active, noise is reduced, thereby reducing computational burden that would otherwise be required to process returned signals.

Figure 9A:
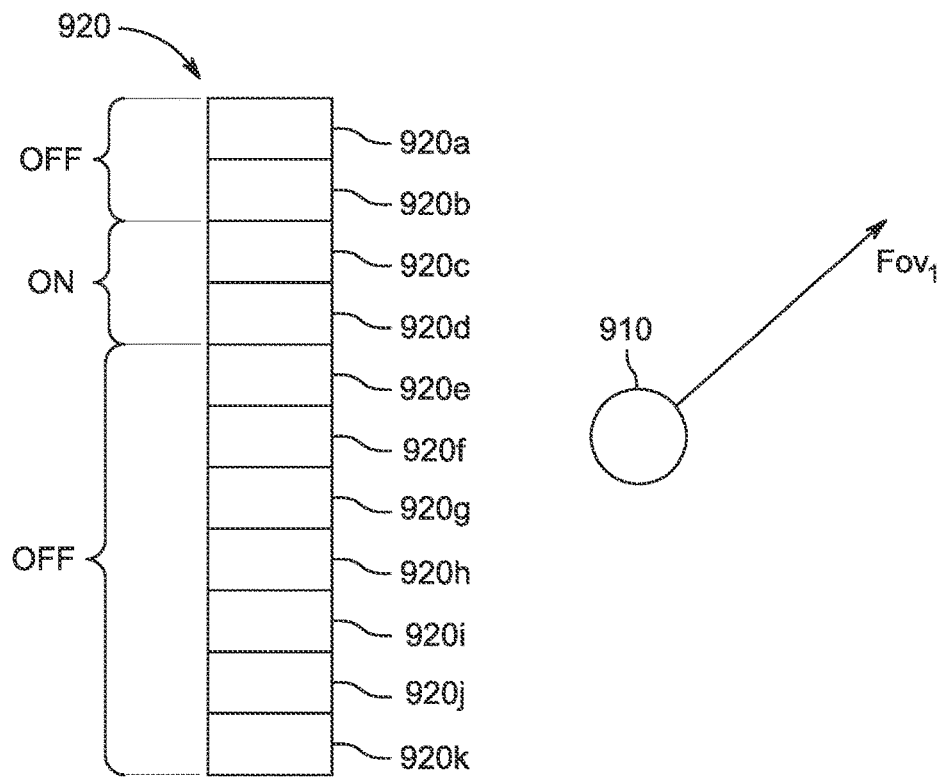
FIGS. 9A, 9B, and 9C show illustrative examples of selective activation and deactivation of detector segments based on a position of a beam steering system.
Figure 9B:
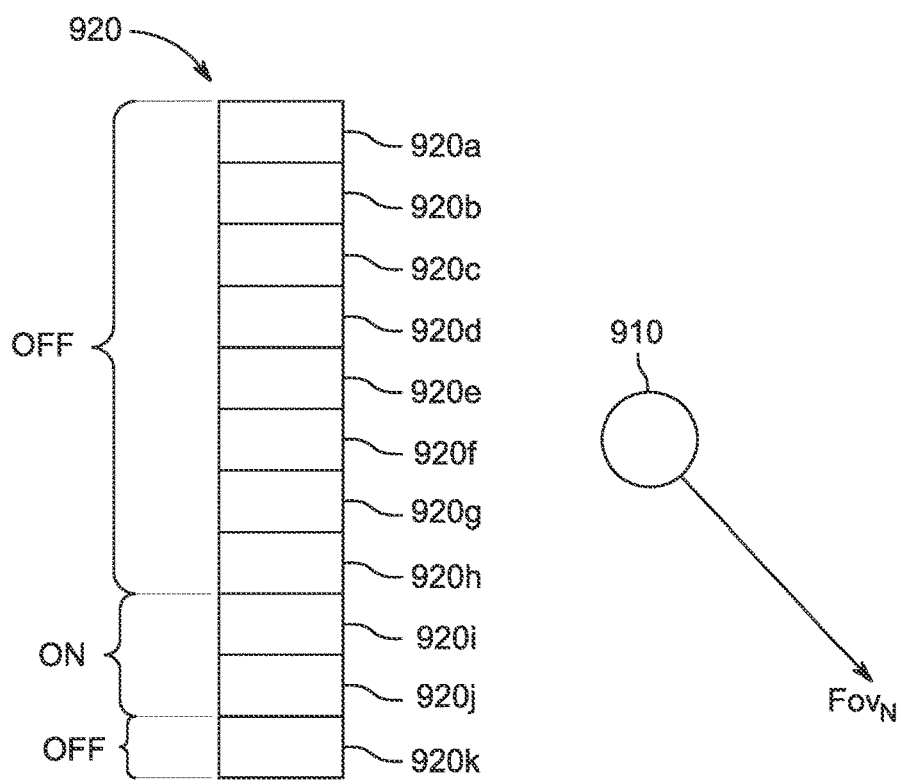
Figure 9C:
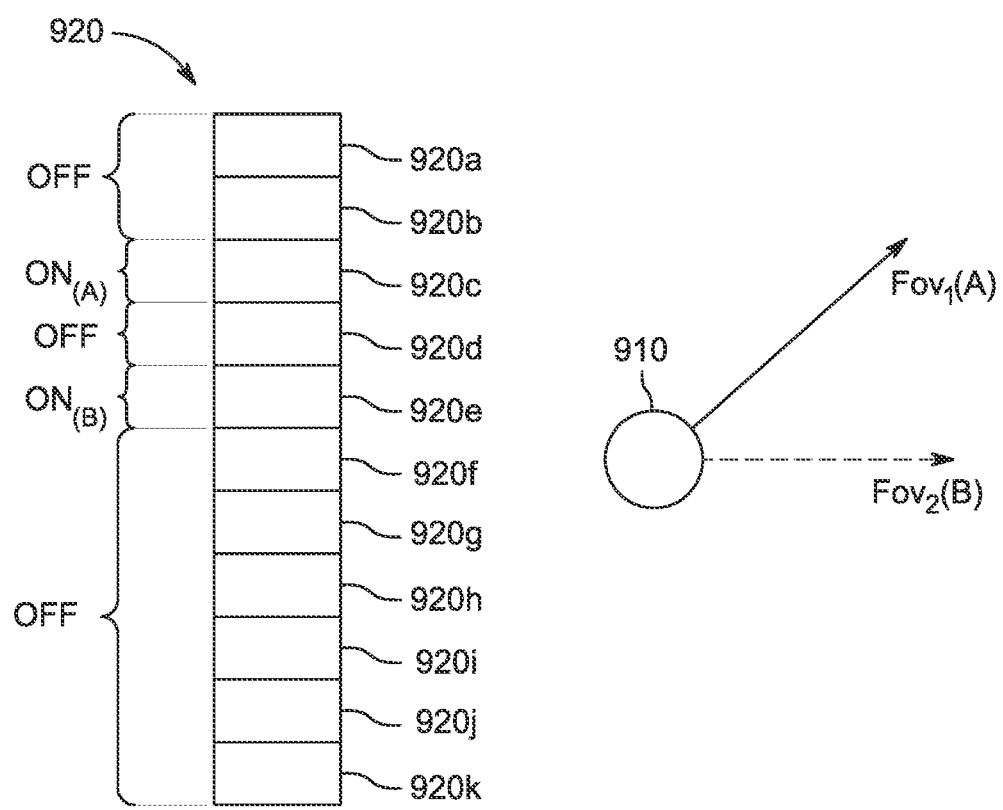

FIGS. 9A-9C show illustrative examples of selective activation and deactivation of detector segments based on a position of a beam steering system. Each of FIGS. 9A-9C show beam steering system 910 and detector array 920, which has detector segments 920a-920k. Referring to FIG. 9A, beam steering system 910 is directing a light pulse to FOV1 location. Based on this particular FOV1 location, detector segments 920c and 920d are ON, whereas all other detector segments are OFF. In FIG. 9B, beam steering system 910 is directing a light pulse to FOVN location. Based on this particular FOVN location, detector segments 920i and 920j are ON, whereas all other detector segments are OFF. In FIG. 9C, beam steering system 910 is directing two light pulses to FOV1(A) and FOV2(B) locations. Based on these light pulse FOV angles, detector segment 920c is ON to detect the return angle corresponding to FOV1(A) and detector segment 920e is ON to detect the return angle corresponding to FOV2(B). All other detector segments are turned OFF.

In some embodiments, an exemplary LiDAR system can further include a second detector array configured to provide auto-balancing. For example, the second detector array can have the same type or configuration as detector array 734. The second detector array, however, can be configured to receive only background light or noise and provide the noise signal to the controller. The controller can thus correlate the signals provided by the first and second detector arrays by, for example, subtracting the background noise signals provided by the second detector array from the signal provided by the first detector array (which includes both the scattered light generated by an object and the background noise). The auto-balancing can enhance the performance of the LiDAR system under certain conditions where the background noise may not be readily distinguished from the scattered light of an object. For example, during night time, many ambient lights are illuminating and thus background noise may include light at the laser wavelength used by the LiDAR system. As a result, absent of auto-balancing, the scattered light from an object may not be readily distinguished from ambient lights.

Figure 10:
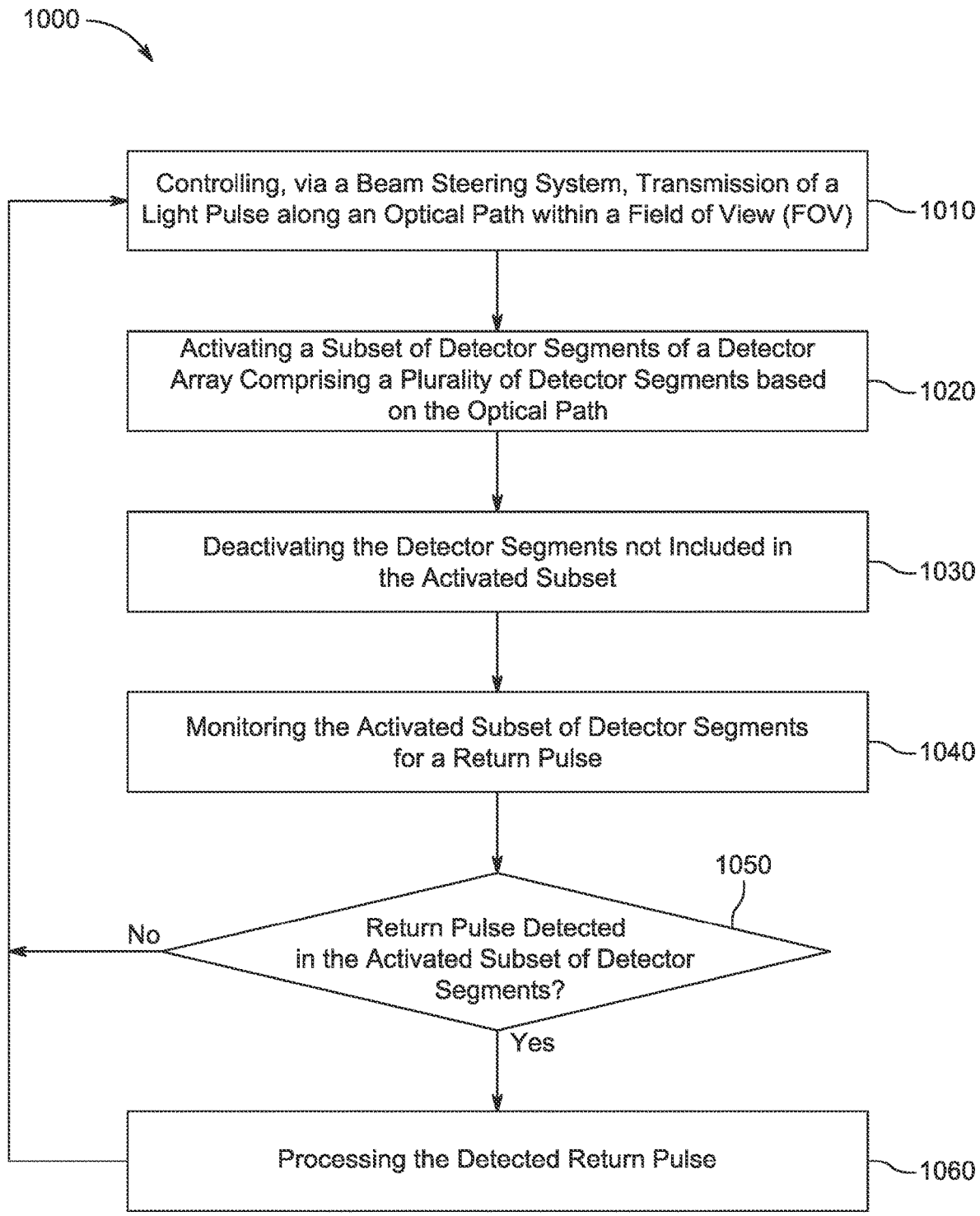
FIG. 10 shows an illustrative process according to an embodiment.

FIG. 10 shows illustrative process 1000 according to an embodiment. Process 1000 may be implemented in a LiDAR system such as LiDAR system 700. Process 1000 may start at step 1010, where transmission of a light pulse is controlled, via a beam steering system, to be directed along an optical path within a field of view (FOV), wherein each transmitted light pulse corresponds to an unique optical path. For example, beam steering system 720 may control where each light pulse is directed within a FOV of the LiDAR system, and control circuitry 750 has knowledge of the optical path. At step 1020, a subset of detector segments of a detector array comprising a plurality of detector segments is activated based on the optical path. For example, control circuitry 750 may turn one or more detectors segments 734a-734i of detector array 734 based on the optical path of the light being transmitted by the beam steering system. At step 1030, detector segments not included in the activated subset are deactivated. The activated subset of detector segments monitor for a return pulse, at step 1040. If a return pulse is detected in the activated subset of detector segments (at step 1050), the detected return pulse is processed (at step 1060). That is, the detected return pulse is used to populate a frame of the FOV. If the determination at step 1050 is NO, process 1000 can return to step 1010.

It should be appreciated that the steps shown in FIG. 10 are merely illustrative and that additional steps may be added.

Figure 11B:
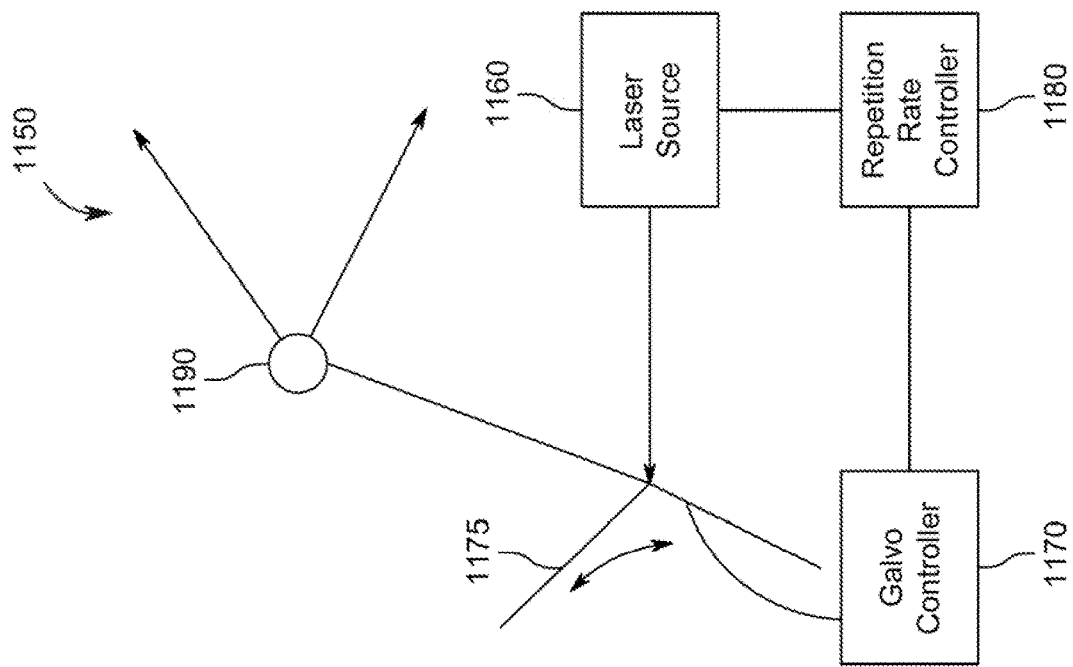
FIGS. 11A and 11B show simplified diagrams of different LiDAR systems, according to various embodiments
Figure 11A:
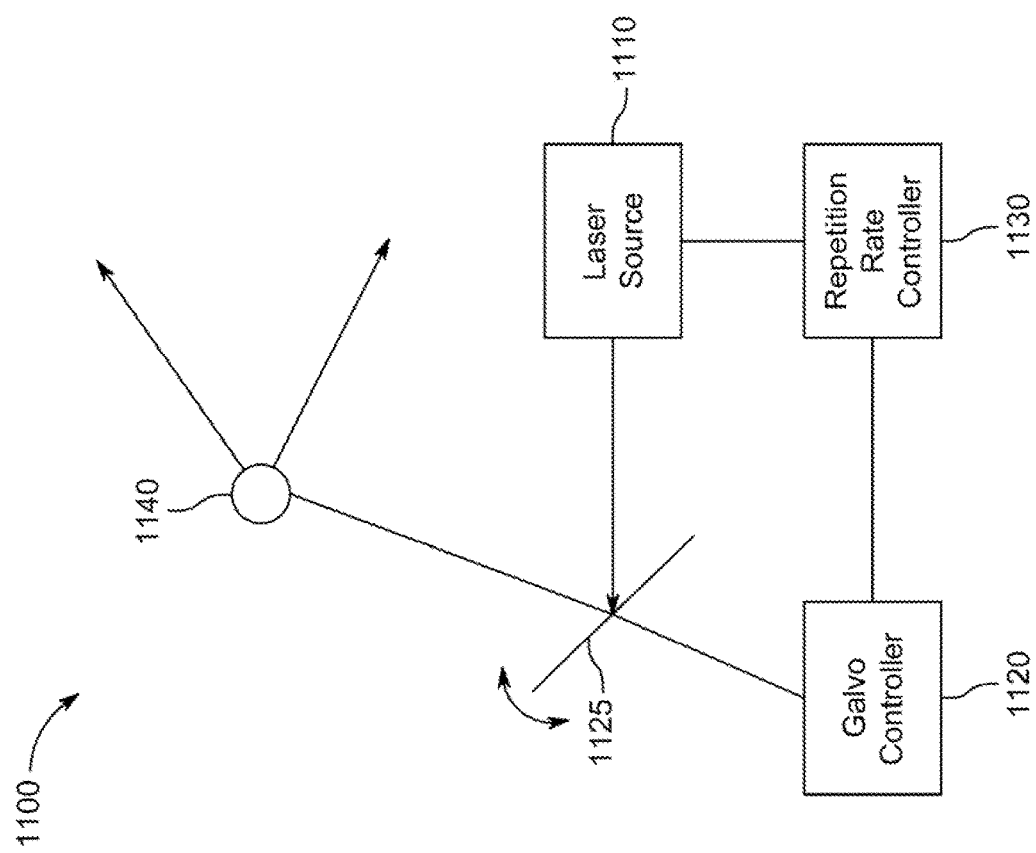

FIGS. 11A and 11B show simplified diagrams of LiDAR system 1100 and 1150, respectively. LiDAR systems 1100 and 1150 can include many of the same components as LiDAR system 700, and can include laser source 1110 and 1160, galvo controller 1120 and 1170, galvo 1125 and 1175, repetition rate controller 1130 and 1180, and MEMS steering system 1140 and 1190, respectively. Galvos 1125 and 1175 may differ between system 1100 and 1150. Galvo 1125 may be a single plane mirror, whereas galvo 1175 may be a dual plane mirror. Both galvos 1125 and 1175 oscillate to redirect laser pulses to their respective MEMS steering system and to control a first axis of the LiDAR system's FOV. The operation of galvos 1125 and 1175 can produce different scanning patterns (assuming all things are equal such as a constant repetition rate). If desired, the position of galvos 1125 and 1175 may be switched with MEMS steering systems 1140 and 1175, respectively.

Figure 12A:
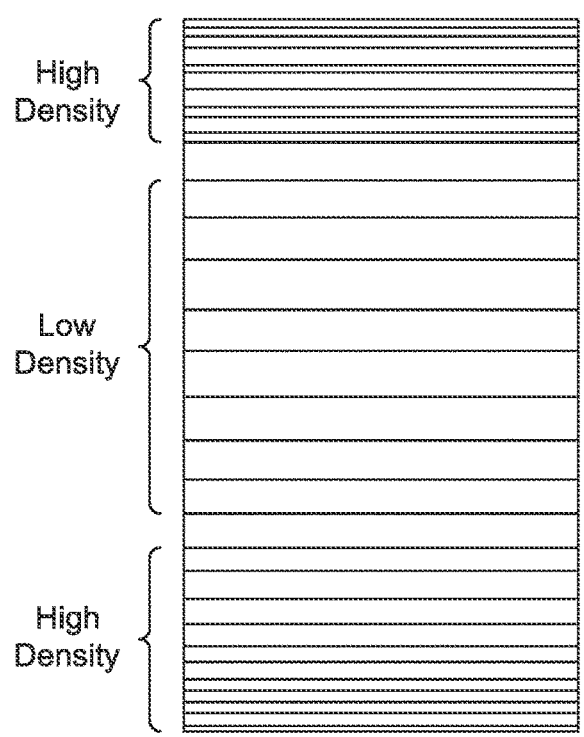
FIGS. 12A and 12B show illustrative fields of view of a LiDAR system according to various embodiments.
Figure 12B:
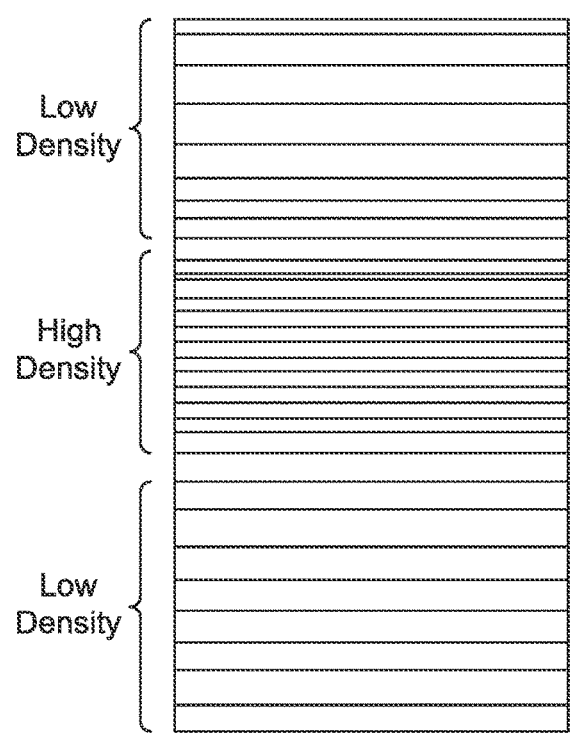

During oscillation of galvo 1125, galvo 1125 will slow down at the transition points (e.g., the point at which the single plane reverses direction). As a result, the scanning density can be higher at the transition points than other points of the oscillation cycle. For example, FIG. 12A shows an illustrative scanning density produced by galvo 1125 (when the repetition rate is held constant). As shown in FIG. 12A, the density is higher near the transition points than the other points. The higher density near the transition points may not be as desired because light transmissions at those regions within the FOV may not be as useful as other angles within the FOV. One way to control the density of light transitions throughout the oscillation cycle of galvo 1125 is to control the repetition rate of the light pulses being emitted by laser source 1110. Repetition rate controller 1130 can control the repetition rate. For example, the time interval between successive light pulses may be increased (e.g., to decrease frequency) at and/or near the transition points for galvo 1125. This way, when galvo 1125 is at or approaching its transition points, the repetition rate can be decreased to reduce the density of light pulses transmitted at or near the transition point. If desired, the repetition rate can be increased for one or more regions of interest within the FOV. For example, the repetition rate may be increased when galvo 1125 is positioned to transmit light pulses at angles ranging between −2 degrees to 3 degrees of the LiDAR system's FOV. FIG. 12B shows an illustrative scanning density produced by galvo 1125 when the repetition rate is controlled. As shown, density if greater in the middle portion of the FOV and less dense at the transition points.

The dual plane mirror of galvo 1175 can be driven using a direct drive or a resonant drive. Direct drive is typically used for relatively slow scanning rates (e.g., up to around 3 Hertz) and a resonant drive is typically used for relatively faster scanning rates (e.g., greater than 5 Hertz). Direct drives may be limited in their ability to operate at faster scanning rates because the power required support the scanning rate is the cube of the frequency. This may be because a strong anti-current is needed to reverse direction. Thus, while a faster scan rate may be desirable, it may not be practical in implementation. For example, if a system such as system 1100 uses a direct drive, increased scanning rates may be realized with the cost of a significant power penalty. This may be because significant energy must be expended to reverse direction of the single plane mirror's movement. In addition, because a single plane mirror is being used in a direct drive mode, the scanning density is relatively higher at the top and low ends of the vertical field of view, and the center region of the field of view has a relatively low scanning density, as shown in FIG. 12A.

In a system such as system 1150, which uses a dual plane mirror, increased scanning rates can be achieved using a resonant drive mode. The resonant drive mode can leverage a "spring" or potential energy to operate at relatively higher frequencies without an exponential (e.g., cube of the frequency) power penalty. Using a dual plane mirror in resonance mode can result in a scanning density that is relatively higher in the middle portion of the field of view as compared to the top and bottom portions. See, for example, FIG. 12B, which shows scanning density of a system using a dual plane mirror in a resonance mode. Note that although FIG. 12B is also being used in context with system 1100, the same scanning pattern can be reproduced by both systems 1100 and 1150.

Figure 12C:
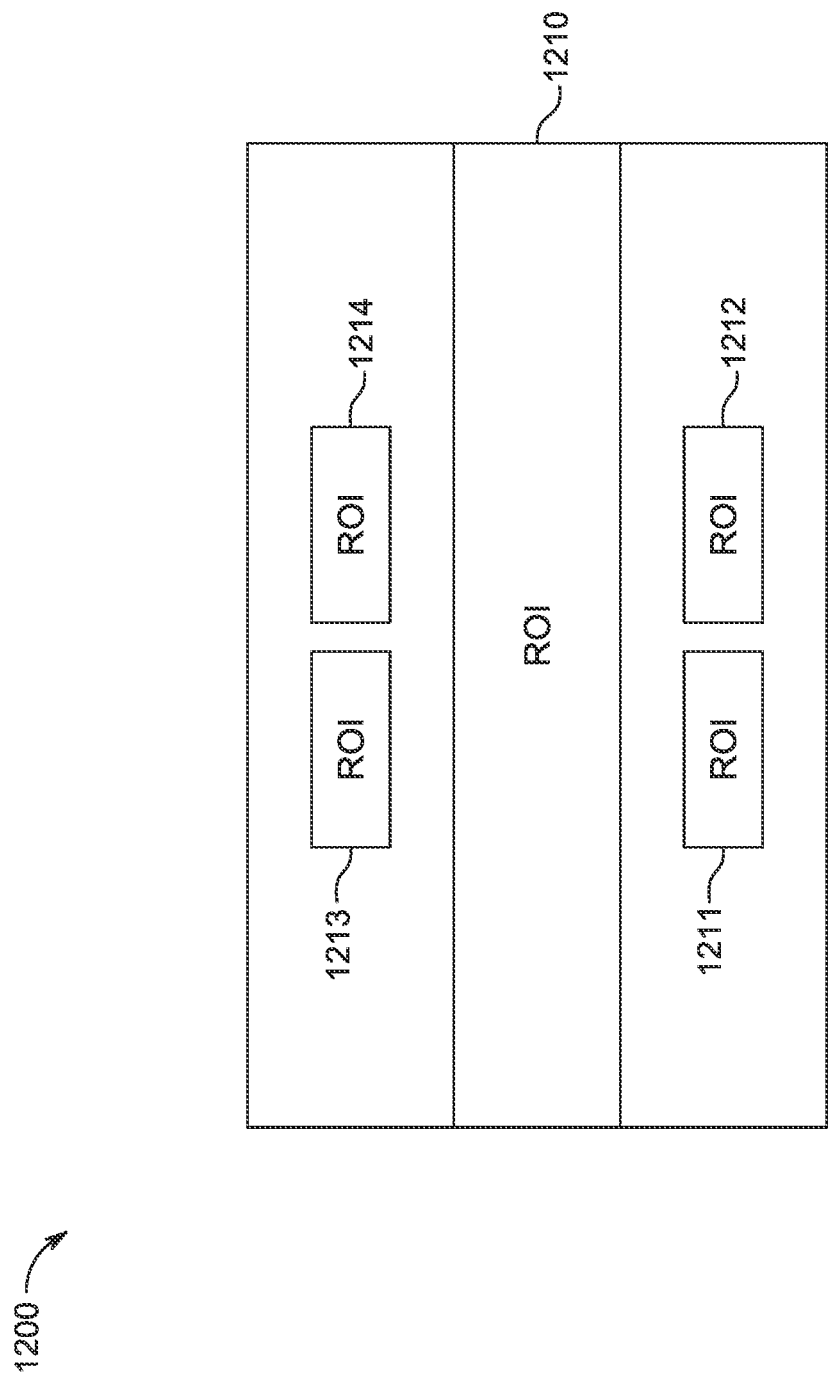
FIG. 12C shows illustrative field of view of a LiDAR system according to an embodiment.

FIG. 12C shows illustrative field of view (FOV) 1200 of a LiDAR system according to an embodiment. As shown, FOV 1200 is a two-dimensional space bounded by X and Y dimensions. Although the LiDAR system can collect data points from the entirety of FOV 1200, certain regions of interest (ROI) may have higher precedence over other regions within FOV 1200 (e.g., such as undesired regions that occupy all space within FOV 1200 that is not a ROI). FIG. 12 shows five different illustrative ROIs 1210-1214 to illustrate different regions within FOV 1200 that require additional data points than other regions within FOV 1200. For example, ROI 1210 occupies an entire band of a fixed y-axis height across the x-axis of FOV 1200. ROIs 1211 and 1212 show localized ROIs below ROI 1210, and ROIs 1213 and 1214 show localized ROIs above ROI 1210. It should be understood that any number of ROIs may exist and that the ROIs can occupy any portion of FOV 1200. Embodiments discussed herein enable additional data points to be collected in the ROIs in a manner that does not disrupt the operation of the LiDAR system.

Figure 13:
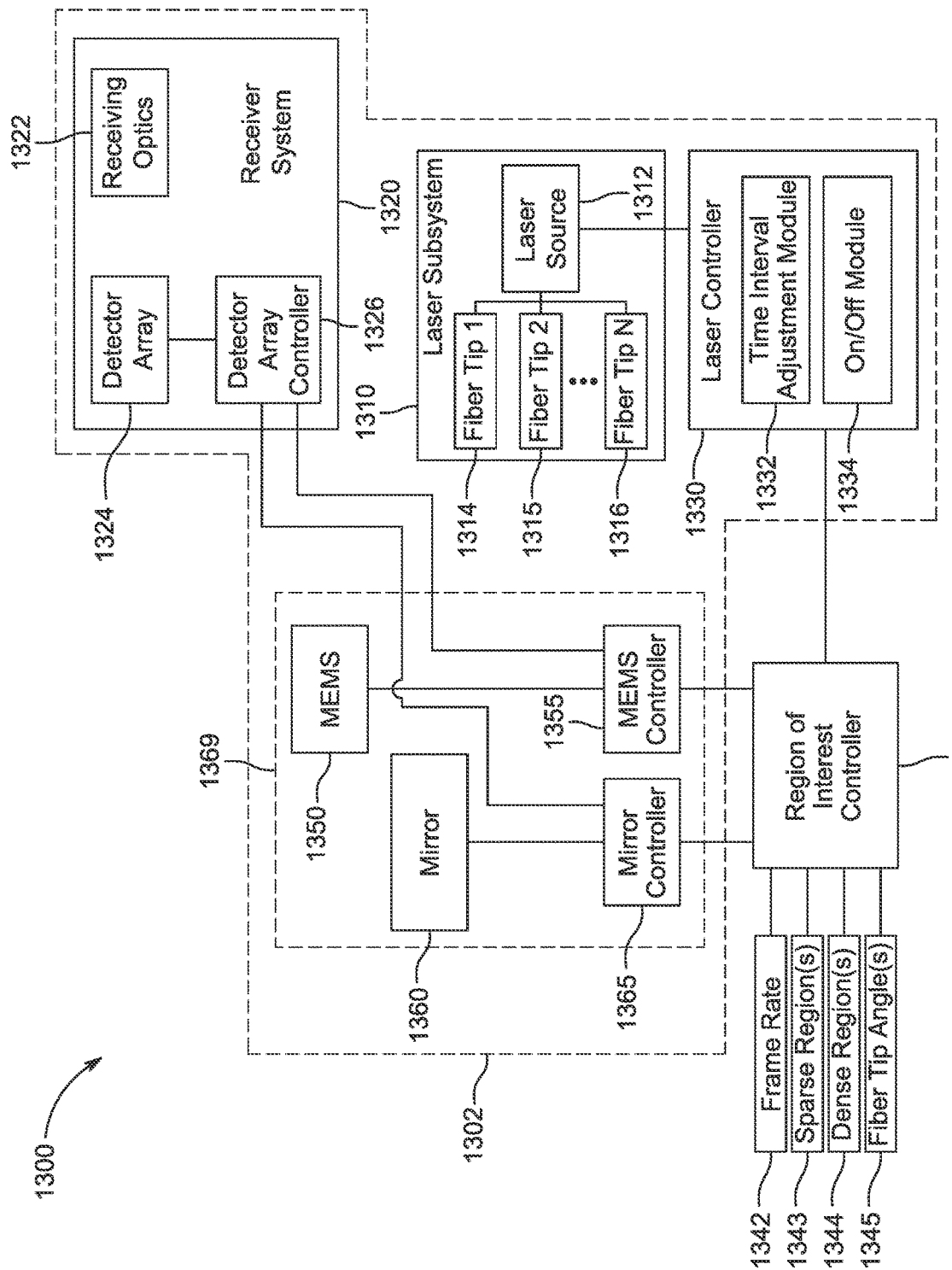
FIG. 13 shows an illustrative block diagram of LiDAR system according to an embodiment.

FIG. 13 shows an illustrative block diagram of LiDAR system 1300 according to an embodiment. LiDAR system 1300 can include laser subsystem 1310, receiver system 1320, laser controller 1330, region of interest controller 1340, MEMS structure 1350, MEMS controller 1355, mirror 1360, and mirror controller 1365. LiDAR system 1300 may be contained within one or more housings. In multiple housing embodiments, at least one of the housings may be a temperature controlled environment in which selection portions of LiDAR system 1300 (e.g., laser controller 1330, laser source 1312, controller 1340) are contained therein. MEMS structure 1350, MEMS controller 1355, mirror 1360, and mirror controller 1365 may collectively be represented by beam steering system 1369.

Laser subsystem 1310 may be operative to direct light energy towards mirror 1360, which redirects the light energy to MEMS structure 1350. Mirror 1360 may be moved under the control of mirror controller 1365, which can control the speed and direction of mirror movement. As mirror 1360 moves, it causes light being transmitted by laser subsystem 1310 to interface with MEMS structure 1350. MEMS structure 1350 can be a MEMS mirror or a liquid crystal. MEMS structure 1350 is controlled by MEMS controller 1355 and is operative to direct the light energy received from mirror 1360 in accordance with the field of view parameters of LiDAR system 1300. That is, if LiDAR system 1300 has a field of view with range of z, a lateral angle of x, and vertical angle of y, the range z can be controlled by the power of laser source 1312, the vertical angle y can be controlled by MEMS structure 1350, and the lateral angle x can be controlled by the movement of mirror 1360. Light energy that is reflected back from objects in the field of view and returns to polygon structure 1350 where it is directed back to mirror 1360, which redirects it back to receiver system 1320.

Receiver system 1320 can include receiving optics 1322, detector array 1324, and detector array controller 1326. Receiving optics 1322 may be operative to collect returned light pulses and direct the returned pulses to detector array 1324. Detector array 1324 may include a several detector segments that are selectively turned ON and OFF under the direction of detector array controller 1326. Detector array controller 1326 may selectively turn detector segments ON and OFF based on registration signals provided by mirror controller 1365 and/or MEMS controller 1355. This way, two different degrees of angle control can be used to register selective activation and deactivation of detector segments.

As defined herein, a frame rate may refer to the time it takes for scanning system 1302 to complete one full scan of the FOV. For each frame, scanning system 1302 can obtain data points from each row (or column) of a plurality of rows (or columns) that are defined by the FOV. Each row may correspond to a vertical angle within the vertical range of the FOV. The vertical angle is controlled by mirror 1360. As mirror 1360 moves, the vertical angle changes, thereby enabling scanning system 1302 to obtain data points from multiple rows within the FOV. Vertical angle resolution refers spacing between adjacent rows of data points. An increase in vertical angular resolution corresponds to denser spacing between adjacent rows, and such an increase can be achieved by decreasing the delta of the vertical angles between adjacent vertical angles. The delta between adjacent vertical angels can be decreased by slowing down the movement of mirror 1360. That is, as mirror movement speed slows down, the change in the vertical angle delta decreases. A decrease in vertical angular resolution corresponds to sparser spacing between adjacent rows, and such a decrease can be achieved by increasing the vertical angle delta. The delta between adjacent vertical angels can be increased by speeding up the movement of mirror 1360. That is, as mirror movement speed speeds up, the change in the vertical angle delta increases.

The plurality of data points obtained within any row may depend on a horizontal angle within the horizontal range of the FOV. The horizontal range may be controlled by polygon 1350, and the horizontal angle resolution may be controlled by a time interval of successive laser pulses. The time interval is sometimes related to the repetition rate. A smaller time interval can result in increased horizontal angular resolution, and a larger time interval can result in decreased horizontal angular resolution.

The above reference to vertical and horizontal angles and vertical and horizontal angular resolution was made in reference to a system in which mirror 1360 controls the horizontal angle. It should be understood that mirror 1360 can be repurposed to control the vertical angle and used in a system different than that shown in FIG. 13.

Laser subsystem 1310 can include laser source 1312 and fiber tips 1314-1316. Any number of fiber tips may be used as indicated the "n" designation of fiber tip 1316. As shown, each of fiber tips 1314-1316 may be associated with laser source 1312. Laser source 1312 may be a fiber laser or diode laser. Fiber tips 1314-1316 may be aligned in a fixed orientation so that the light exiting each tip strikes mirror 1360 at a particular location. The actual orientation may depend on several factors, including, for example, frame rate, mirror movement and speed, polygon speed, ROIs, repetition rate, etc. Additional discussion of fiber tips and their characteristics in obtaining additional data points within ROIs is discussed in more detail below.

Laser controller 1330 may be operative to control laser source 1312. In particular, laser controller 1330 can control power of laser source 1312, can control a repetition rate or time interval of light pulses emitted by laser source 1312 (via time interval adjustment module 1332), and can control pulse duration of laser source 1312. Time interval adjustment module 1332 may be operative to control and/or adjust the repetition rate/time interval of the transmitter pulse of laser 1310. Time interval adjustment circuitry 1332 can vary the repetition rate/time interval for different regions within the FOV. For example, the repetition rate may be increased for ROIs but may be decreased for areas of FOV that are not of interest. As another example, the time interval can be decreased for ROIs and increased for areas of FOV that are not of interest.

Region of Interest controller 1340 may be operative to control LiDAR system 1300 to obtain additional data points for the ROIs. That is, when LiDAR system 1300 is scanning a ROI, ROI controller 1340 may cause system 1300 to operate differently than when system 1300 is not scanning a ROI. ROI controller 1340 may control operation of laser controller 1330, polygon controller 1355, and mirror controller 1365 to alter the quantity of data being obtained by system 1300. ROI controller 1340 may receive several inputs that dictate how it should control the scanning subsystem 1302. The inputs can include, for example, frame rate 1342, sparse regions 1343, dense regions 1344, distance range, or any other suitable input. Frame rate 1342 may specify the frequency at which scanning subsystem 1302 completes a FOV scan. Sparse and dense regions 1343 and 1344 may provide specific locations of ROIs. For example, dense regions 1344 may correspond to ROIs and sparse regions 1343 may correspond to regions within the FOV that are not ROIs. Fiber tip angles 1345 may be used as a design constraint within which scanning sub-system 1302 operates in order to optimally perform scanning.

Mirror 1360 may be a single plane or multi-plane mirror that oscillates back and forth to redirect light energy emitted by laser source 1312 to MEMS structure 1350. The single plane mirror may provide higher resolutions at the top and bottom portions of the vertical field of view than the middle portion, whereas the multi-plane mirror may provide higher resolution at a middle portion of the vertical field of view than the top and bottom portions. Mirror 1360 may be a galvanometer. Varying the oscillation speed within an oscillation cycle can enable scanning subsystem 1302 to acquire sparse or dense data points within the FOV. For example, if dense data points are required (for a particular ROI), the movement speed may be reduced, and if sparse data points are required (for non-ROIs), the movement speed may be increased.

Figure 14:
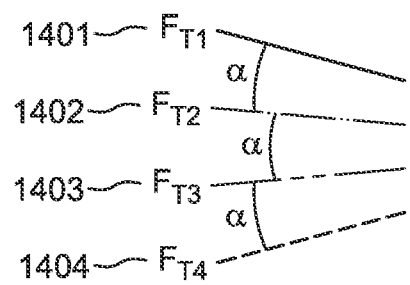
FIG. 14 shows an illustrative fiber tip arrangement according to an embodiment.

FIG. 14 shows illustrative fiber tip arrangement according to an embodiment. Four fiber tips 1401-1404 are shown to be oriented with respect to each other such that the same angle α exists between adjacent fiber tips. Multiple fiber tips (as opposed to just one fiber tip) may be used so that high data collection is achieved. When an ROI is being scanned, the mirror movement speed is adjusted to a ROI speed (e.g., a speed that is slower than a sparse or non-ROI speed), the combination of additional fiber tips and reduced relative mirror movement speed yields denser data capture. Moreover, when a non-ROI is being scanned, the mirror movement speed operates at a non-ROI speed (e.g., a speed that is faster than the ROI speed), the presence of multiple fiber tips ensures that sufficient data collection is achieved. The angle α may be selected based on properties of the light energy being emitted by each fiber tip (e.g., size), speed and movement characteristics of a mirror (e.g., mirror 1360) for both ROIs and non-ROIs, and speed of the polygon (e.g., polygon structure 1350). The angles between each of tips may be the same or they can be different.

In some embodiments, all four fiber tips may be associated with the same laser source. Thus, if the laser source is turned OFF, none of the fiber tips will emit light energy. In another embodiment, each fiber tip may be associated with its own respective laser source. This embodiment provides a high degree of ON/OFF control of each fiber tip. In yet another embodiment, a subset of the fiber tips may be associated with the same laser source. For example, fiber tips FT1 and FT3 may share a first common laser source, and fiber tips FT2 and FT4 may share a second common laser source. This embodiment provides a balance between all or none and individual ON/OFF control.

Figure 15A:
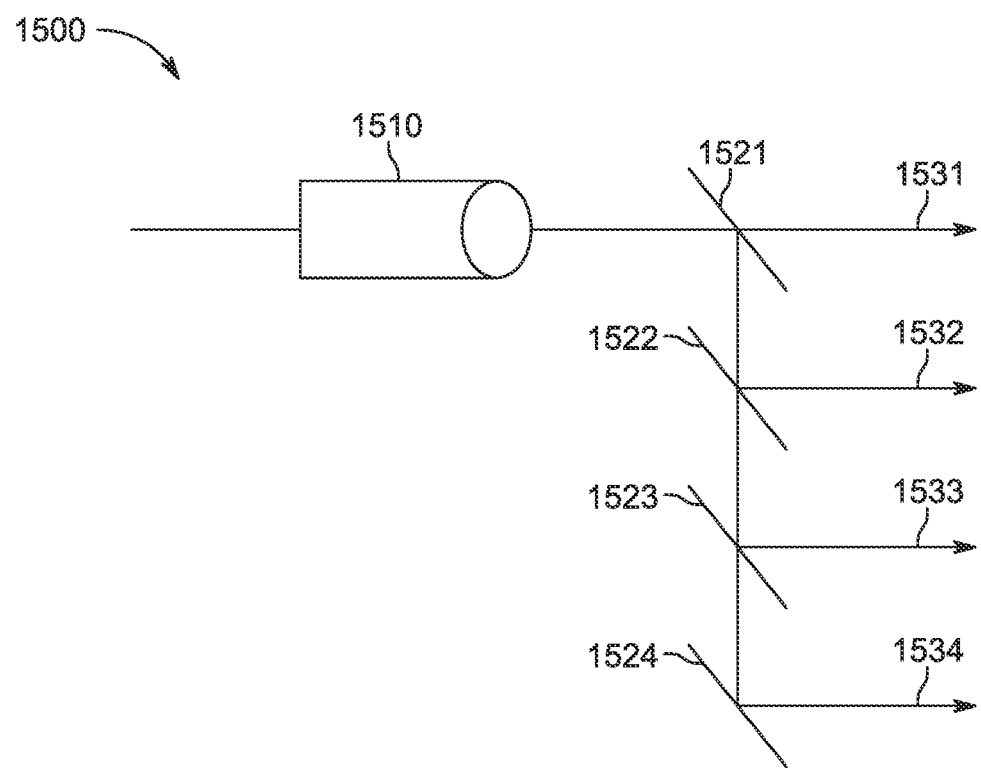
FIGS. 15A and 15B show multiple mirror alignment arrangement that may be used for various embodiments.

FIG. 15A shows a multiple mirror alignment arrangement (MMAA) 1500 that may be used for ROI and non-ROI embodiments. MMAA 1500 is an alternative to using multiple fiber tips such as that shown in FIG. 14. As shown, MMAA 1500 shows collimator 1510, partial reflective mirrors 1521-1523, and reflective mirror 1524. Light energy originating from a laser source (not shown) is routed to collimator 1510, which directs light energy to partial reflective mirror 1521. Partial reflective mirror 1521 permits a portion of the light energy to pass through (shown as exit path 1531) and the remaining light energy is redirected to partial reflective mirror 1522. Partial reflective mirror 1522 allows a portion of the light energy to pass through to partial reflective mirror 1523. Partial reflective mirror 1522 redirects light energy along exit path 1532. Partial reflective mirror allows a portion of the light energy to pass through to partial reflective mirror 1524. Partial reflective mirror 1523 redirects light energy along exit path 1533. Reflective mirror 1524 may redirect all or at least a portion of all the remaining light energy along exit path 1534.

The angles between adjacent exit paths may be selected to achieve the desired resolution for ROIs and non-ROIs. For example, angles between adjacent exit paths may be similar to the a angles shown in FIG. 14. In some embodiments, the angle between adjacent exit paths may be fixed. In other embodiments, the angle between adjacent exit paths may be variable. Variable angle adjustment may be used to provide different resolutions on demand. For example, if the LiDAR system is being used in a vehicle, the angles may be set to a first configuration when the vehicle operating in a first mode (e.g., driving at highway speeds or vehicle is driven by a first driver) and may be set to a second configuration when the vehicle is operating in a second mode (e.g., driving at city speeds or vehicle is driven by a second driver).

Figure 15B:
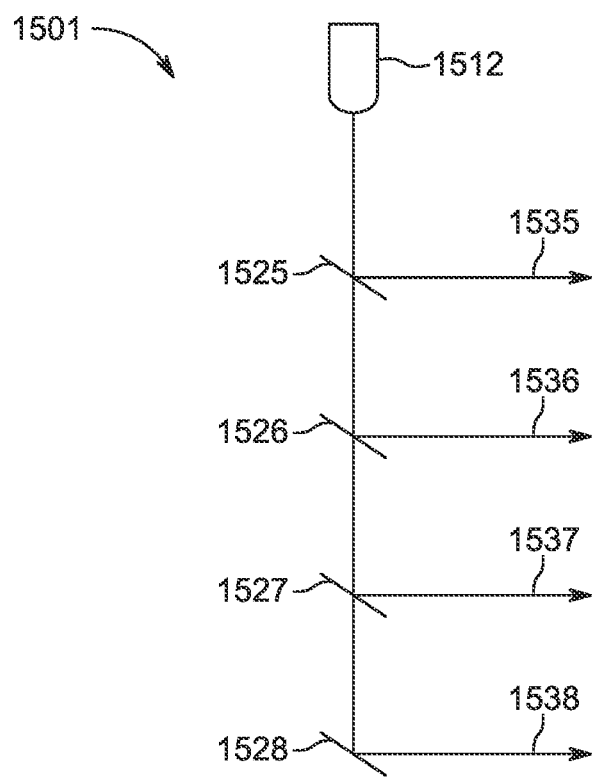

FIG. 15B shows another multiple mirror alignment arrangement (MMAA) 1501 that may be used for ROI and non-ROI embodiments. MMAA 1501 is an alternative to MMAA 1500. As shown, MMAA 1501 shows collimator 1512, partial reflective mirrors 1525-1527, reflective mirror 1528, and exit paths 1535-1538. MMAA 1501 is similar to MMAA 1500 with exception of the positioning of collimator 1512. As shown, collimator 1512 is positioned above mirror 1525. If desired, collimator 1512 can be positioned below mirror 1528. As a further alternative, collimator 1512 can be aimed at a different mirror such as mirror 1526 or mirror 1527, and such mirrors can redirect the light energy as necessary to achieve the desired results.

Figure 15C:
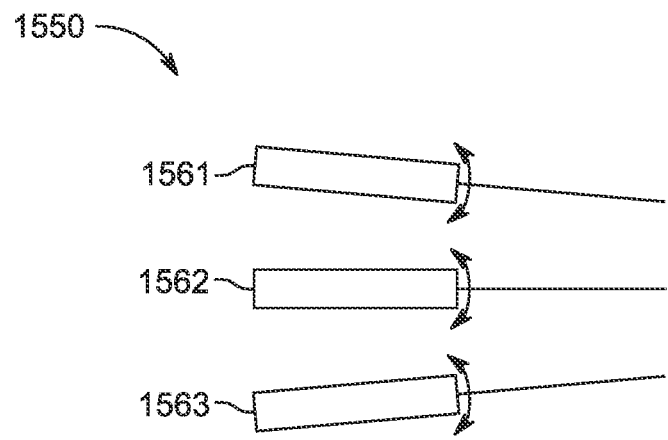
FIG. 15C shows an illustrative multiple collimator arrangement that may be used for various embodiments.

FIG. 15C shows an illustrative multiple collimator arrangement 1550 that may be used for ROI and non-ROI embodiments. Arrangement 1550 can include collimators 1561-1563. Each of collimators 1561-1563 may be associated with its own laser source. Associating each collimator with its own laser source enables selective turning ON and OFF of light energy emanating from each collimator. For sparse regions, one or more of the laser sources may be turned OFF (to save power) and for dense regions, all laser sources may be turned ON to maximize resolution. Each of collimators 1561-1563 may be fixed in a particular orientation to achieve the desired a angle between each collimator. If desired, each of collimators 1561-1563 may be movable to dynamically adjust the a angle between each collimator.

Figure 15D:
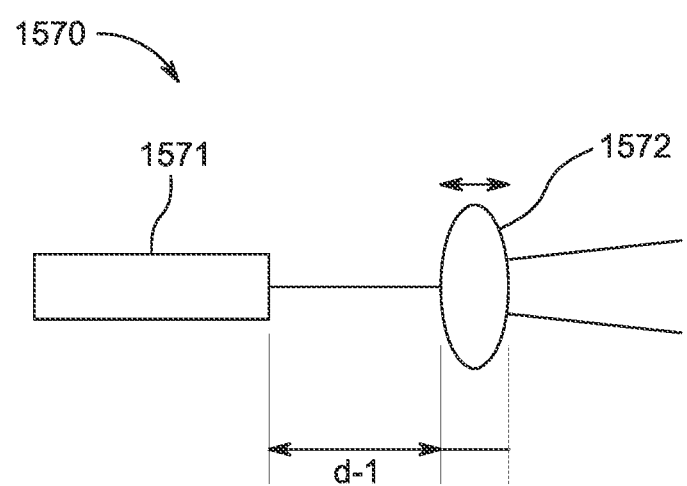
FIG. 15D shows an illustrative collimator and lens arrangement according to an embodiment.

FIG. 15D shows an illustrative collimator and lens arrangement 1570 that may be used to control divergence of the light beam existing collimator 1571 according to an embodiment. Lens 1572 may be moved towards and away from collimator 1571 to adjust divergence of the light beam. Arrangement 1570 may be used to adjust the size of the light beam as it is projected by the scanning system. For ROI regions, it may be desirable to have a relatively narrow beam. To produce a relatively narrow beam, lens 1572 may positioned at a narrow beam distance away from the collimator 1571. For non-ROI regions, it may be desirable to have a relatively wide beam. To produce a relatively wide beam, lens 1572 may positioned at a wide beam distance away from the collimator 1571.

Figure 16:
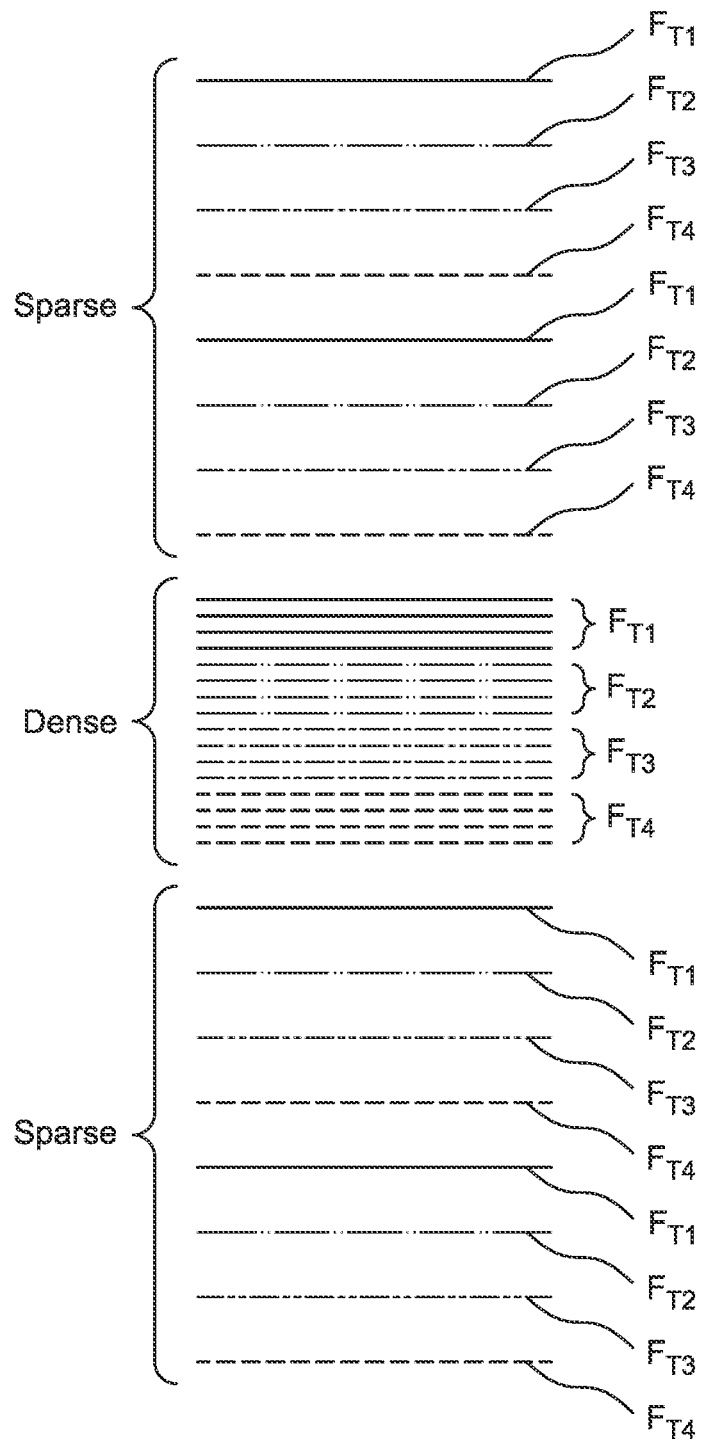
FIG. 16 shows illustrative scanning resolution using multiple fiber tips, a multiple mirror alignment arrangement, or multiple collimator arrangement according to an embodiment.
Figure 17A:
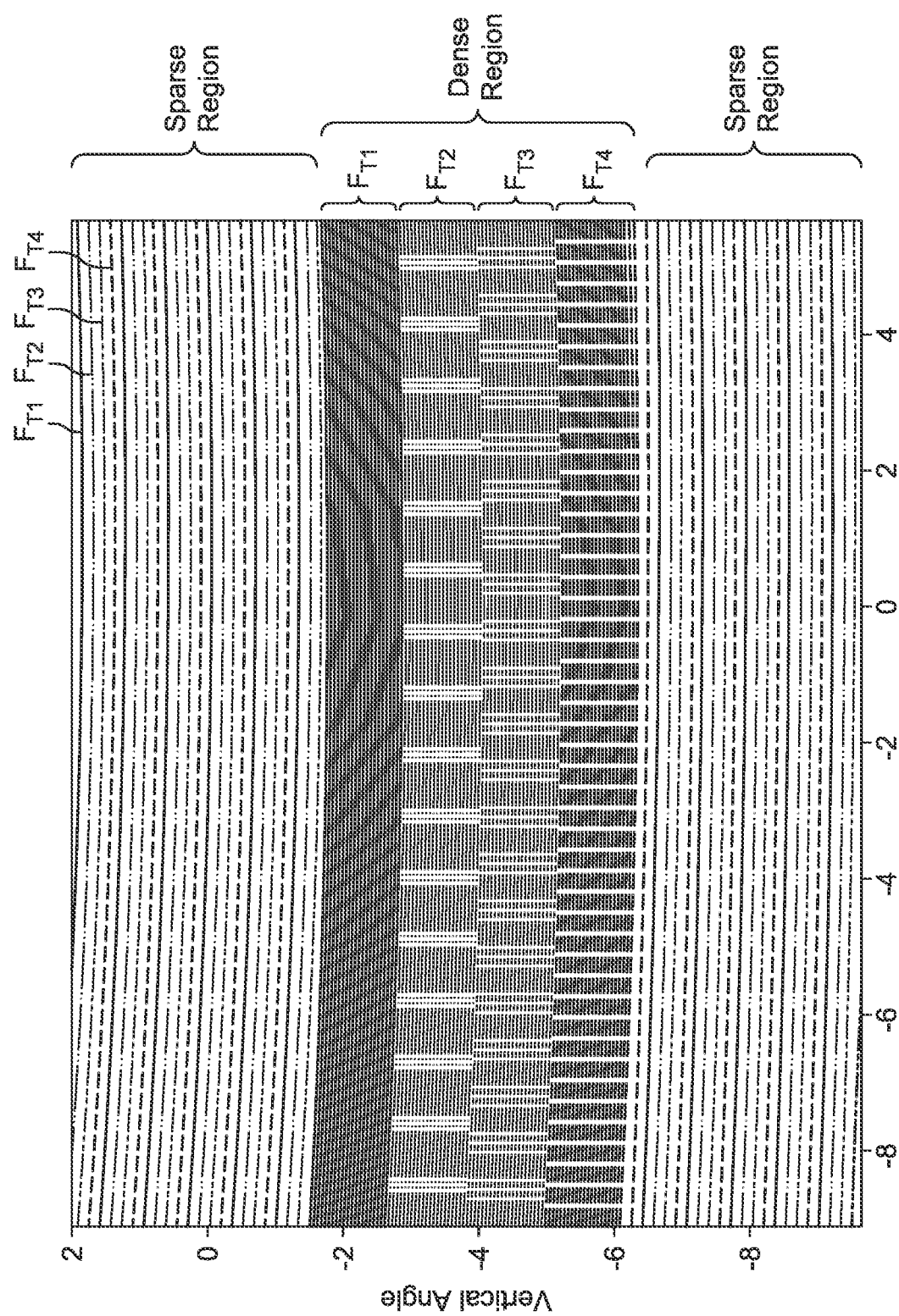
FIG. 17A shows another illustrative diagram of vertical resolution using multiple fiber tips or a multiple mirror alignment arrangement, according to an embodiment.

FIG. 16 shows illustrative scanning resolution using multiple fiber tips, a multiple mirror alignment arrangement, or multiple collimator arrangement according to an embodiment. The illustrative vertical resolution lines from fiber tips (FT1-FT4) are shown. The resolution lines are grouped according to sparse resolution and dense resolution as shown. In sparse regions, the scanning system is moving the mirror at a relatively faster speed than when in the dense region, and in dense regions, the scanning system is moving the mirror at a relatively slower speed than when in the sparse region. The spacing between the adjacent scanning lines (as shown by the repeated pattern of FT1-FT4) is substantially equidistant. This equidistant spacing may be made possible by coordinating the alignment of the fiber tips with the frame rate, mirror speed, polygon speed, and any other suitable factors. In contrast, if alignment of fiber tips is not properly coordinated, the equidistant spacing may not be possible, thereby yielding an undesirable scanning pattern. In the dense region, each fiber tip may provide multiple lines of resolution. For example, as shown, FT1 provides four lines of resolution before FT2 provides its four lines of resolution. Thus, each fiber tip provides four lines of resolution before transitioning to the next fiber tip. It should be understood that the number of lines of resolution provided by each fiber tip depends on a number of factors, including, for example, mirror speed, polygon speed, and angle between fiber tips. The lines of resolution among fiber tips may interlace at the transition between the sparse and dense regions. For example, at least one line of resolution from one or more of fiber tips FT2-FT4 may be interlaced among the four lines of resolution pertaining to FT1 (as shown in FIG. 17A).

The angle between the fiber tips (e.g., the a) may be selected based on the mirror speeds, polygon speed, desired angular resolution of the ROI, and a requirement for the spacing between the resolution lines in the sparse region(s) to be substantially equidistant to each other. At least two different mirror speeds are used to provide the dense and sparse resolutions, and it is the variance in mirror speeds that can cause the resolution lines to be non-equidistant if the angles between fiber tips are not properly aligned. For example, assume that the angle of the dense region is θ. θ can represent the total degrees within the FOV that are part of the ROI and require dense resolution. If the mirror speed is constant throughout the entire frame, the angle between fiber tips, α, can be approximately θ/n, where n is the number of fiber tips. This $\alpha_{cs}$, referred to as angle with constant speed may represent a target angle for the fiber tips, but additional calculations are required to take into account that the mirror operates at different speeds, and as a result α, cannot be set to exactly θ/n. The sparse regions must be taken into account. In the sparse region, assume that the desired angle between adjacent lines of resolution is ϕ. For the example, ϕ may exist between FT1 and FT2, between FT2 and FT3, between FT3 and FT4, between FT4 and FT1 in the sparse region. In order to achieve ϕ between different fiber tips, the angle between fiber tips can be calculated by the following equation:

$$\alpha = \alpha_{vs} = \phi * n * 2 - \phi$$

where $\alpha_{vs}$ is the angle with a variable speed mirror, ϕ is the angle between adjacent lines of resolution within the sparse region, n is the number of fiber tips, and the number 2 is a scaling factor to take into account overlapping lines of resolution. The variables of ϕ, n, mirror speed, and polygon speed are selected such that $\alpha_{vs}$ is the same as or approximately the same as $\alpha_{cs}$. Selecting the variables such that $\alpha_{vs}$ is the same as or approximately the same as $\alpha_{cs}$, enables the scanning system to achieve the desired scanning densities for both ROI and non-ROI regions within the FOV each frame.

FIG. 17A shows another illustrative diagram of vertical resolution using multiple fiber tips or a multiple mirror alignment arrangement, according to an embodiment. Sparse regions and a dense region are shown. Four fiber tips FT1-4 are used. In the sparse region, the resolution lines for each fiber tip are evenly spaced. In the dense region, the vertical lines of resolution are substantially more dense than the vertical lines of resolution in the sparse regions. Within the dense region, the vertical lines of resolution are grouped predominantly for each fiber tip, however, interlacing resolution lines from other fiber tips may exist within a particular group.

Figure 17B:
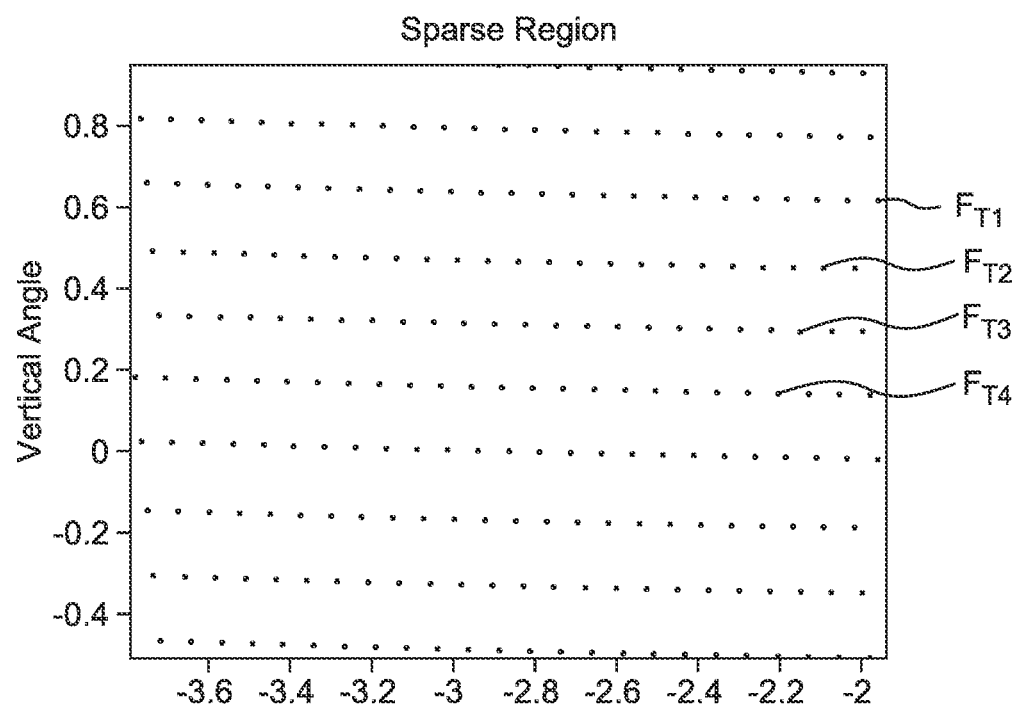
FIG. 17B shows an illustrative close-up view of a sparse region within FIG. 17A
Figure 17C:
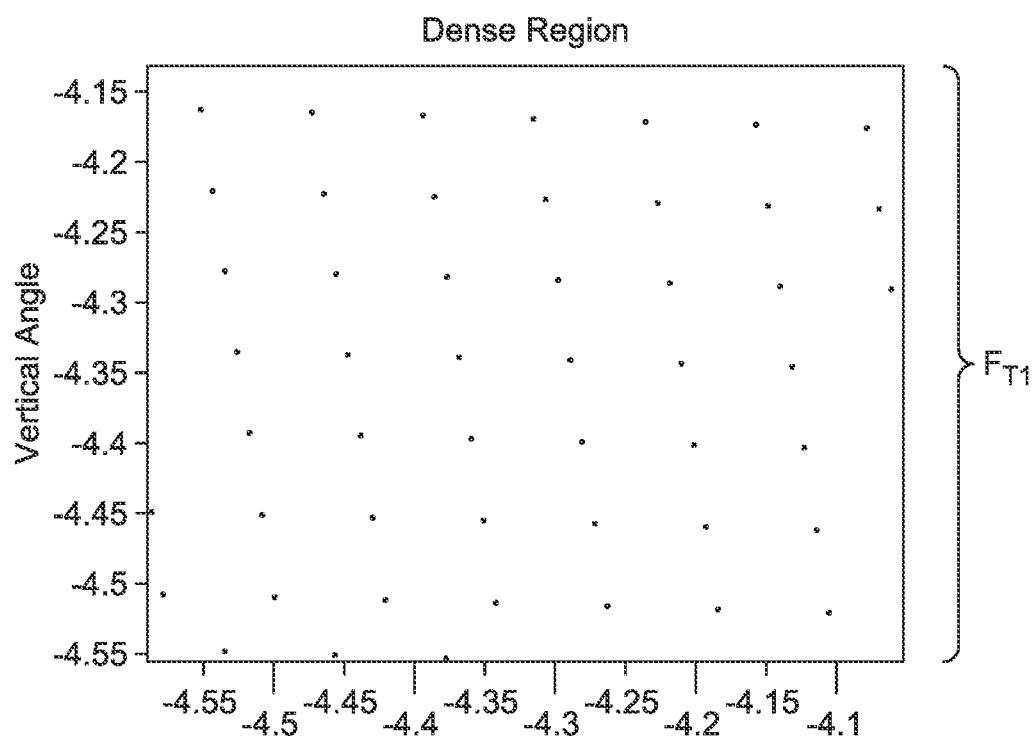
FIG. 17C shows an illustrative close-up view of the dense region within FIG. 17A, according to various embodiments.

FIG. 17B shows an illustrative close-up view of a sparse region within FIG. 17A and FIG. 17C shows an illustrative close-up view of the dense region within FIG. 17A, according to various embodiments. Note that the scaling factor in FIG. 17B is less zoomed in than it is in FIG. 17C. As a result, FIG. 17B shows lines of resolution for multiple fiber tips, and where FIG. 17C shows multiple lines of resolution for only one fiber tip.

The dynamic resolution discussed above has been in the context of dynamic vertical resolution. If desired, the laser subsystem (e.g., the fiber tips, multiple mirror alignment arrangement, or multiple collimator arrangement) can be oriented in a horizontal direction (as opposed to the above-described vertical direction) to provide dynamic horizontal resolution.

Assuming speed changes to mirror movement are used to control the vertical resolution, the repetition rate or time interval can be changed to dynamically control the horizontal resolution. This provides dual axis dynamic resolution control that can be synchronized by a controller (e.g., ROI controller 1340) to provide increased resolution for ROIs and decreased resolution for non-ROIs for both vertical and horizontal orientations. For example, when the scan cycle comes across an ROI, the mirror movement speed is decreased and the time interval between successive light pulses is decreased (thereby increasing repetition rate). When the scan cycle comes across a non-ROI, the mirror movement speed is increased and the time interval between successive light pulses is increased (thereby decreasing repetition rate).

In some embodiments, the laser source(s) can be selectively turned ON and OFF to provide vertical dynamic range (assuming the laser subsystem is oriented as such). This can eliminate the need to adjust the mirror speed to achieve dynamic vertical resolution. If desired, however, the laser source(s) can be selectively turned ON and OFF in conjunction with variations in mirror movement speed.

Figure 18:
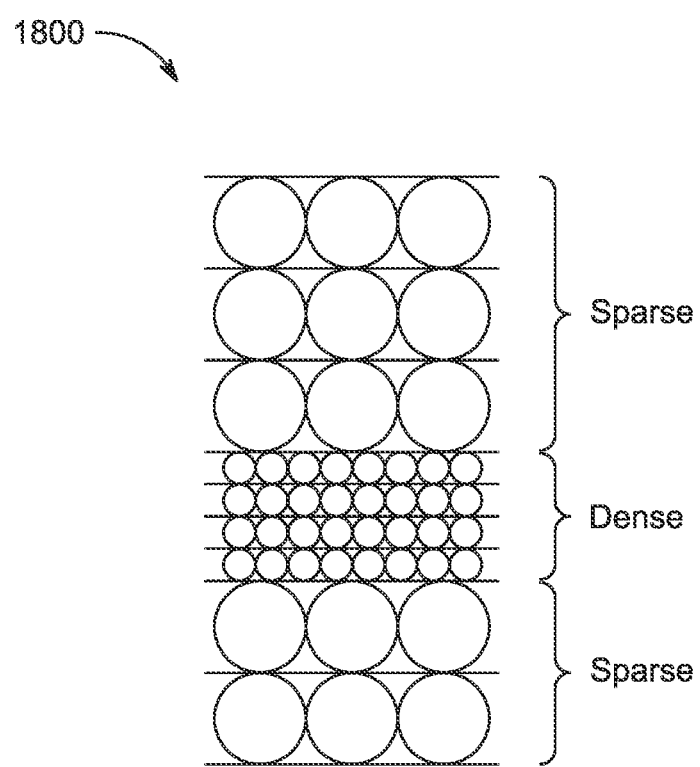
FIG. 18 shows illustrative FOV with variable sized laser pulses according to an embodiment.

FIG. 18 shows illustrative FOV 1800 with variable sized laser pulses according to an embodiment. FOV 1800 includes two sparse regions and one dense region as shown. Both the sparse and dense regions show illustrative light pulses that take the form of different sized circles. The sparse sized circles are larger than the dense sized circles. When the scanning system is projecting light to the sparse region, the mirror speed may be moving at a sparse speed and the repetition rate may be set to a sparse region repetition rate. Conversely, when the scanning system is projecting light to the dense region, the mirror speed may be moving at the dense speed and the repetition rate may be set to a dense region repetition rate. The sparse speed is faster than the dense speed and the sparse region repetition rate is slower than the dense region repetition rate. As a result, there are fewer light pulses being sent into the sparse region than in the dense region. If the circle size of the light pulses projected into the sparse region were the same size as the circles in the dense region, underfilling could exist. Underfill may occur when too much space exists between adjacent light pulse circles. Thus, in order to minimize underfill, it is desirable to project an appropriately sized light pulse for both the sparse and dense regions.

Although LiDAR system 1300 and FIGS. 14-18 are described in the context of a system using a single large optic and a detector array similar principles may be applied to a receiver system using a multiple optics and a multiple detectors, such as that described below.

A multiple optic/multiple detector system according to embodiments discussed herein can be used in a LiDAR system in which the light transmission path is not necessarily the same as the light reception path. Decoupling the transmission and reception paths provides design flexibility in the placement of each optic/detector combination. Each optic/detector combination may include an optic designed to capture returned light pulses in a window existing within the FOV and those returned light pulses are processed by a detector that corresponds to that optic. Each window can capture a subset of the FOV or the entirety of the FOV. The optics/detectors can be independently positioned out of the transmission path of the light so long as any object in the FOV is captured by at least two overlapping windows. Capturing return pulses, via at least two overlapping windows, from an object can enable the receiver system to filter out errant light or background noise.

Figure 23:
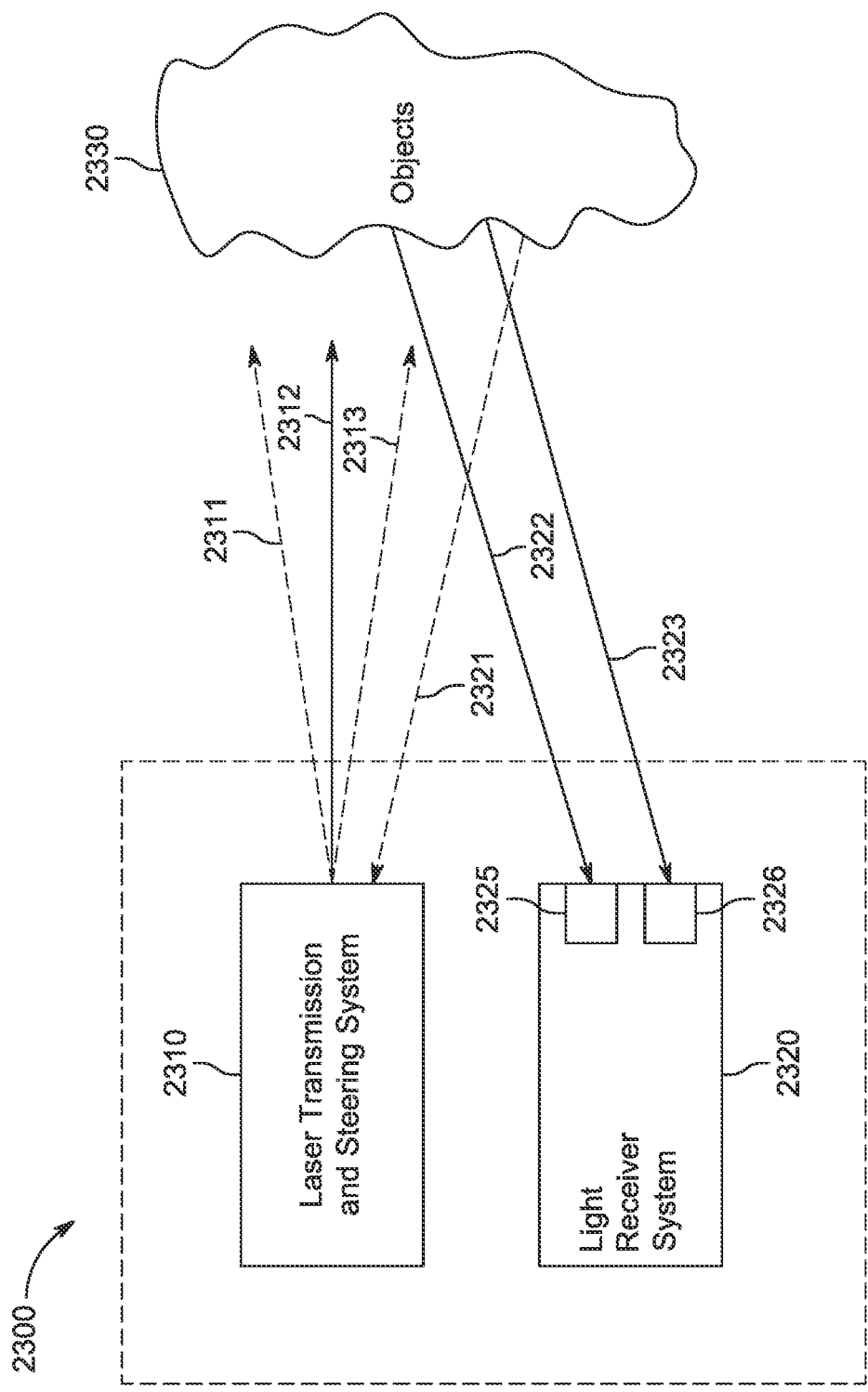
FIG. 23 shows an illustrative LiDAR system according to an embodiment.

FIG. 23 shows an illustrative LiDAR system 2300 according to an embodiment. LiDAR system 2300 can include laser transmission and steering system 2310 and light receiver system 2320. Other components may be included, but are omitted to avoid overcrowding the drawing. Light pulses are transmitted along illustrative paths 2311-2313 towards objects 2330 in the FOV. Light pulses returned from objects 2330 are shown returning along illustrative paths 2321-2323. Return path 2321 may be the same as transmission path 2313 and would require transmission system 2310 to redirect the returned light pulse to receiver system 2320 (e.g., similar to the way light is redirected in FIG. 1). Light returning on paths 2322 and 2323 do not coincide with any transmission path and are returned directly to light receiver system 2320. In some embodiments, first optic/detector combination 2325 may detect light returned along path 2322 and second optic/detector combination 2326 may detect light returned along path 2323. Both optic/detector combinations 2325 and 2326 may have overlapping windows that capture returned light from the same object.

Figure 24:
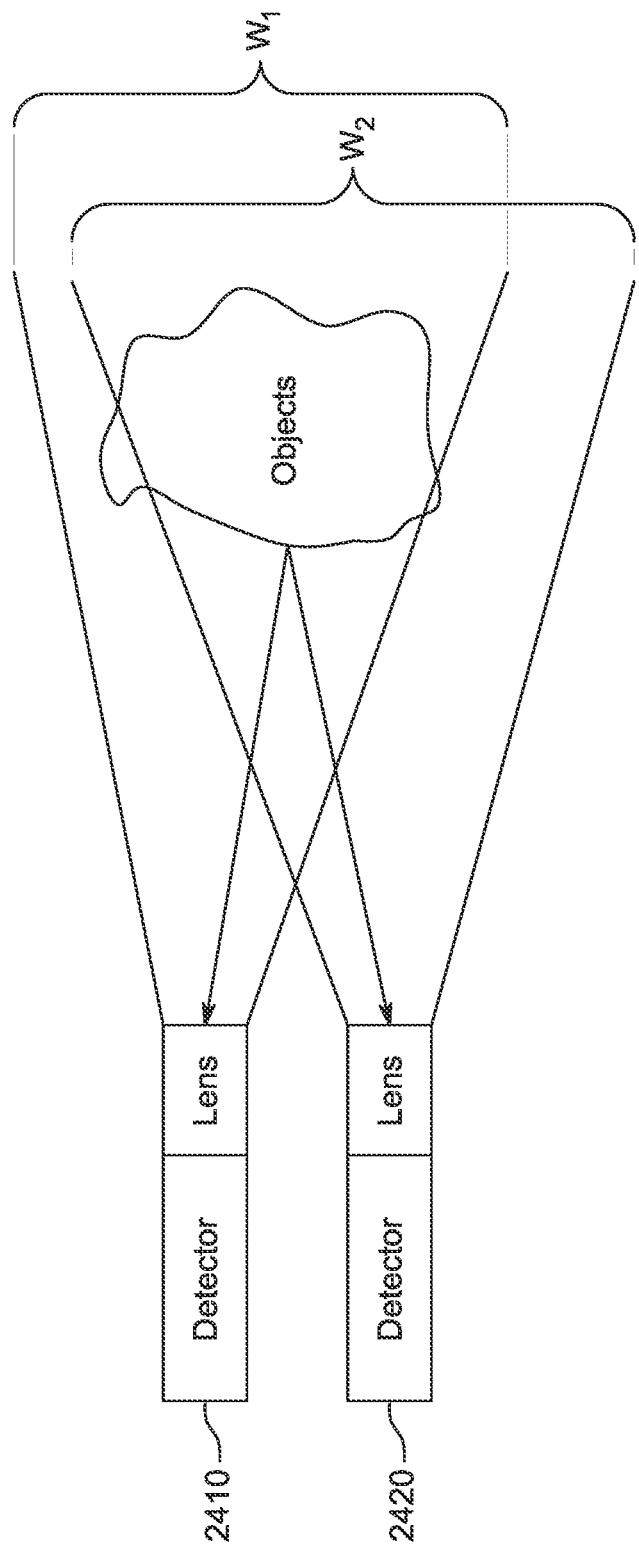
FIG. 24 shows an illustrative schematic of two optic/detector combinations having overlapping windows that capture returned light pulses from the same object within a FOV of a LiDAR system.

FIG. 24 shows an illustrative schematic of two optic/detector combinations having overlapping windows that capture returned light pulses from the same object within a FOV of a LiDAR system. Detector/lens combination 2410 has associated window, W1, and detector/lens combination 2420 has associated window, W2. Windows, W1 and W2, overlap as illustrated.

Figure 19:
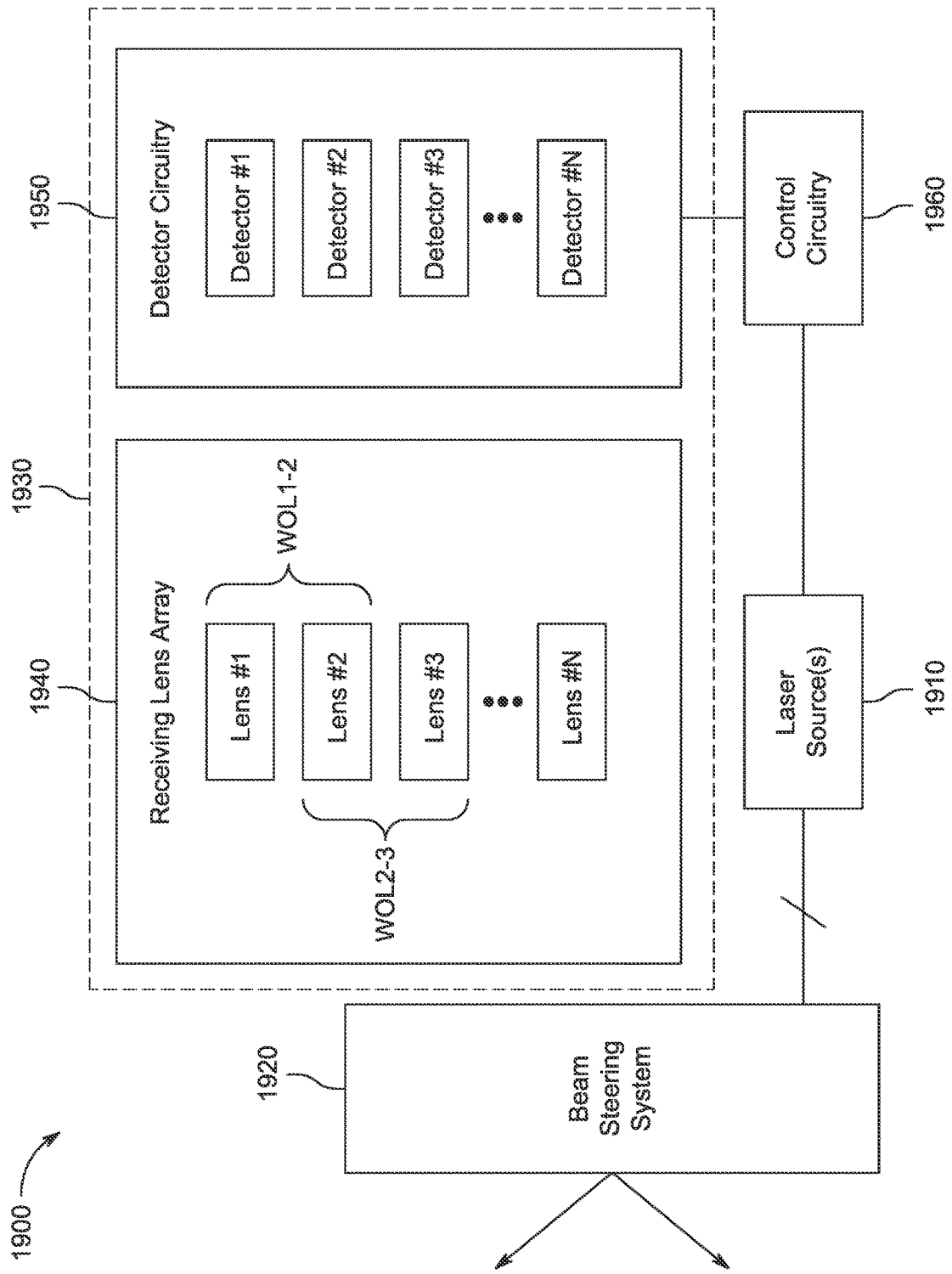
FIG. 19 shows an illustrative multi-lens array based LiDAR system according to an embodiment.

FIG. 19 shows an illustrative multi-lens array based LiDAR system 1900 according to an embodiment. System 1900 can include laser source(s) 1910, beam steering system 1920, receiver system 1930, which can include receiving lens array 1940 and detector circuitry 1950, and control circuitry 1960. In some embodiments, LiDAR system 1900 is similar to LiDAR system 700, but the components of receiver system 1930 are different. The general operating principles are similar. If desired one or more light beams originate from laser source 1910. Returned pulses (not shown) are collected by receiving lens array 1940 and directed to detector circuitry 1950. Detector circuitry 1950 processes returned light pulse and provides a signal corresponding to the returned signal to control circuitry 1960.

Receiving lens array 1940 can include several lenses, shown as lenses 1-N. The combination of all lenses 1-N can detect returned light pulses within the FOV of LiDAR system 1900. The lenses can be arranged to detect all returned light pulses anywhere within the FOV or the lenses can be arranged to emphasize detection of returned light pulses within regions of interest of the FOV (e.g., −10 to +10 degrees in the vertical FOV) and to deemphasize detection of returned light pulses outside of the regions of interest. Each lens can be designed to detect light returned by an object within a window of the FOV. The window represents an area within the FOV. The lenses 1-N can be arranged such that the window corresponding to any given lens overlaps with at least one other window corresponding to at least one other lens. This window overlap can enable two or more lenses corresponding to the overlapping windows to receive the same returned light pulse. For example, FIG. 19 shows that lens1 and lens2 have windows that overlap, as shown by WOL1-2, and the windows of lenses 2 and 3 overlap, as shown by WOL2-3. The overlapping windows, in combination with the discreet detectors 1-N of detector circuitry 1950, can be effective in filtering out noise existing in the FOV.

Detector circuitry 1950 can include several discreet detectors 1-N. Detectors 1-N can be discrete and not an array of detectors as shown in FIG. 7. Each one of detectors 1-N is associated with one of lenses 1-N. Thus, any returned light pulses received by lens 1, for example, is only detected by detector 1, and any returned light pulses received by lens 2 is only detected by detector 2, and so on. This provides a one to one correspondence between lens and detector. This can be advantageous because discrete detectors are cheaper and easier to implement than array based detectors such as detector array 734.

FIG. 20 shows an illustrative diagram of receiver system 1930 of FIG. 19 according to an embodiment. As shown, receiver system 1930 can include receiver processing circuitry 1960, which may be the same as or separate from control circuitry 1960. System 1930 can include detectors 1951-1954 (only four of N possible detectors are shown) and can include lenses 1941-1944 (only four of N possible lenses are shown). Receiver processing circuitry 1960 is connected to each of detectors 1951-1954, and each of detectors 1951-1954 is associated with lenses 1941-1944, respectively. Each of lenses 1941-1944 has associated window 1941a-1944a, as shown. As also shown, two or more of windows 1941a-1944a overlap each other.

The multi-lens array and use of several discrete detectors can provide enhanced flexibility in the design and shape (e.g., the industrial design) of the LiDAR system. For example, LiDAR systems may be used on vehicles such as automobiles or drones and it may be desirable for the LiDAR system to be integrated within or attached to the vehicle in a way that is visually pleasing and unobtrusive, yet is not compromised with respect to its performance.

Thus, the multi-lens array can be arranged to have any desired number and configuration of windows that capture returned light from objects in the FOV. FIGS. 21A-21F show different window arrangements that are derived from a corresponding multi-lens array according to various embodiments. FIG. 21A shows a M×N array of windows 2102a-2102f arranged with a horizontal bias. Windows 2102a-f may each be approximately the same size as each other. Each window may overlap three other windows. For example, windows 2102a may overlap windows 2102b, 2102d, and 2102e. The window overlap shown in FIG. 21A is merely illustrative. If desired, the windows of FIG. 21A can be arranged so that only two windows overlap each other. FIG. 21B shows a N×M array of windows 2112a-

2112f arranged with a vertical bias. In some embodiments, the array of FIG. 21B is the same as the array of FIG. 21A, but turned ninety degrees.

Figure 21C:
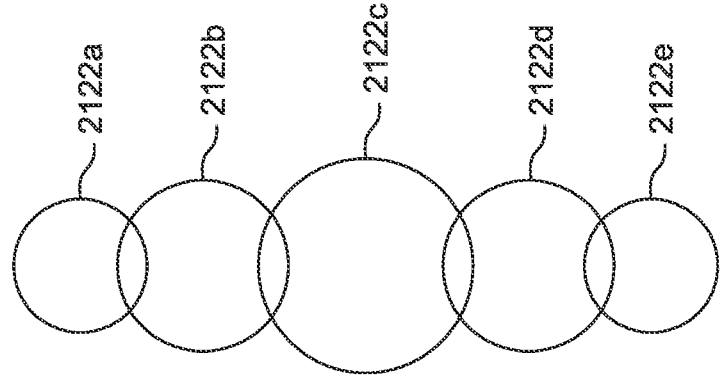
Figure 21A:
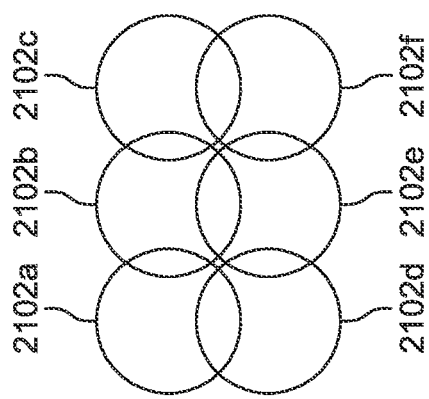
Figure 21B:
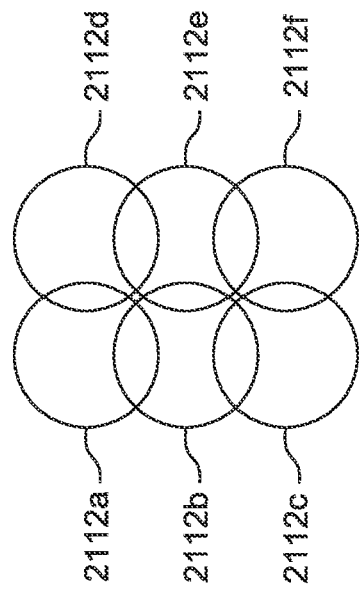

FIG. 21C shows a single row or column of windows 2122a-2122e. Windows 2122a and 2122e may be sized the same, and windows 2122b and 2122d may be sized the same, and window 2122c may be sized different from the other windows. As shown, window 2122a may only overlap with window 2122b, and window 2122b may overlap with both windows 2122a and 2122c, window 2122c may overlap with windows 2122b and 2122d, window 2122d may overlap with windows 2122c and 2122e, and window 2122e may only overlap with window 2122d.

FIG. 21D shows a combination of different sized windows 2132a and 2132b as shown. FIG. 21E shows a combination of similarly sized windows 2142a that overlap each other in a snake like configuration. FIG. 21F shows a combination of similarly sized windows overlapping each other form a triangular shape.

Figure 22:
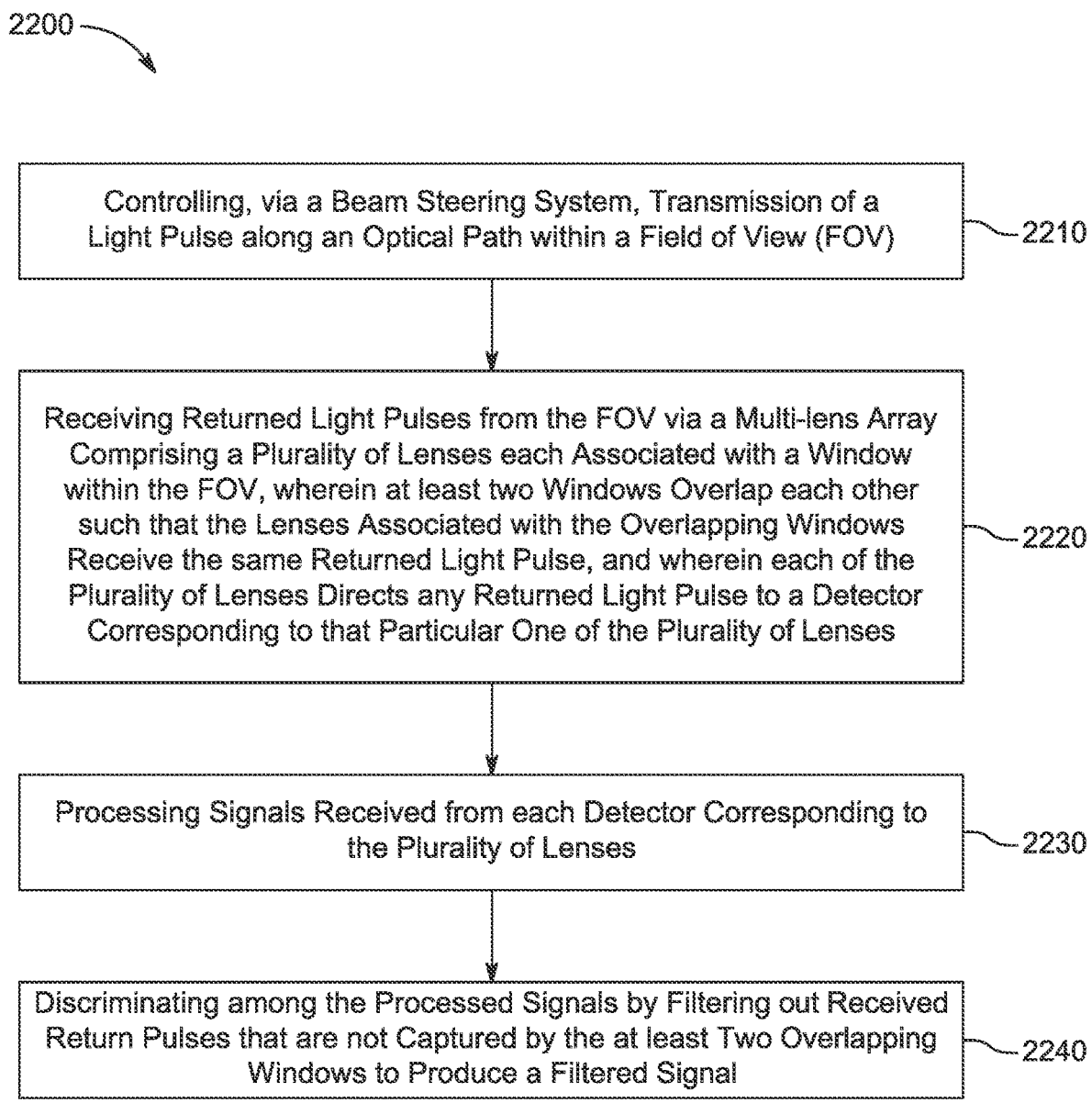
FIG. 22 shows an illustrative process according to an embodiment.

FIG. 22 shows an illustrative process 2200 according to an embodiment. Starting at step 2210, transmission of a light pulse controlling, via a beam steering system, is transmitted along an optical path within a field of view (FOV). At step 2220, returned light pulses can be received from the FOV via a multi-lens array comprising a plurality of lenses each associated with a window within the FOV, wherein at least two windows overlap each other such that the lenses associated with the overlapping windows receive the same returned light pulse, and wherein each of the plurality of lenses directs any returned light pulse to a detector corresponding to that particular one of the plurality of lenses. The multi-lens array can be for example, the multi-lens array of FIGS. 18-20 and FIGS. 21A-21F. At step 2230, signals received from each detector corresponding to the plurality of lenses can be processed. At step 2240, the processed signals can be discriminated by filtering out received return pulses that are not captured by the at least two overlapping windows to produce a filtered signal. That is, if the detectors associated with the overlapping windows do not detect a return light pulse, then that returned light pulse is rejected.

It should be appreciated that the steps shown in FIG. 22 are merely illustrative and that additional steps may be added.

Figure 25:
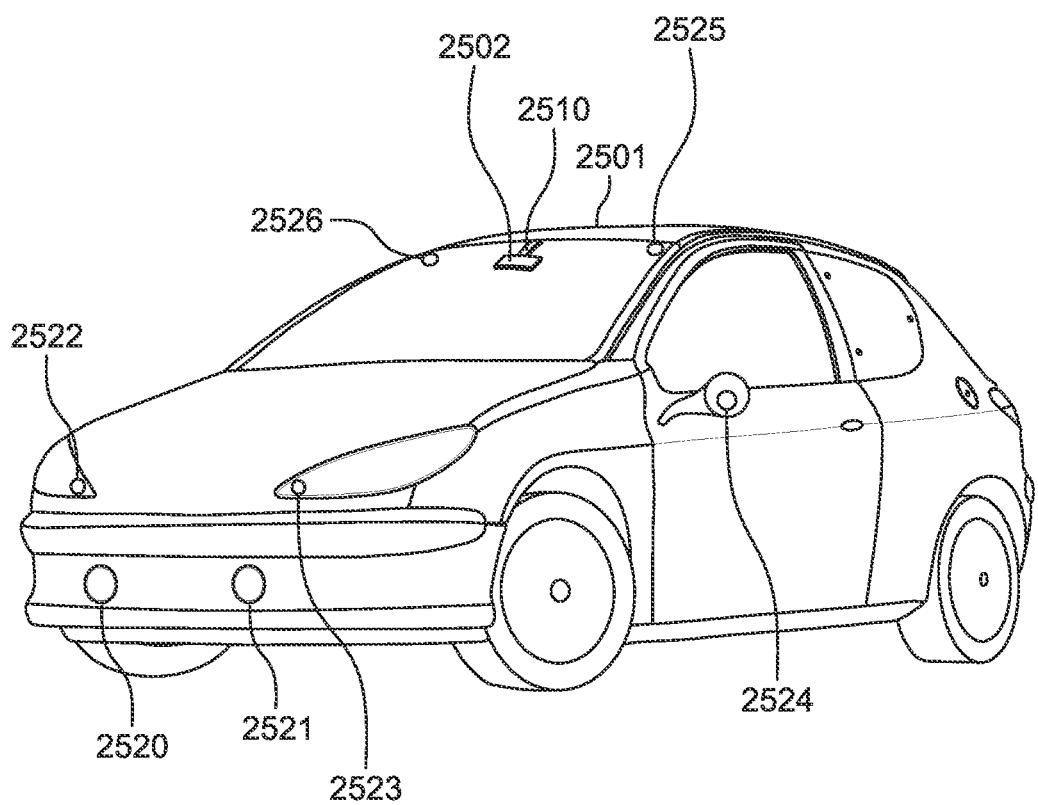
FIG. 25 shows an illustrative vehicle 2501 with an integrated LiDAR system according to an embodiment.

FIG. 25 shows an illustrative vehicle 2501 with an integrated LiDAR system according to an embodiment. Laser transmission and steering system 2510 can be integrated into rear view mirror assembly 2502. If desired, system 2510 can be placed elsewhere on vehicle 2501. Moreover, multiple instances of system 2510 can be placed on vehicle 2501. Multiple instances of optic/detector combinations (ODC) can be placed at various locations on vehicle. For example, ODCs 2520 and 2521 may be located near or at the front of vehicle (e.g., near the grill assembly or the bumper assembly). ODCs 2522 and 2523 may be co-located near the headlight assemblies. ODC 2524 may be co-located with a side mirror assembly as shown. ODCs 2525 and 2526 may be located near the roofline adjacent to the windshield. If desired, an ODC may be integrated with steering system 2510. It should be appreciated that by decoupling the ODC from the light transmission paths, design flexibility in placing ODCs anywhere on vehicle 2501 can be realized.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-25, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A light detection and ranging (LiDAR) system, comprising:
a beam steering system;
a laser system configured to emit light pulses that are steered by the beam steering system such that each emitted light pulse is steered along an optical path within a field of view (FOV);
a receiver system configured to receive return pulses from the FOV, the receiver system comprising:
a detector array comprising a plurality of detector segments; and
a first controller configured to:
selectively activate a subset of the detector segments based on the optical path, and
process a return pulse detected by the activated subset of detector segments.

2. The LiDAR system of claim 1, wherein the beam steering system comprises one or more moveable mirrors.

3. The LiDAR system of claim 2, wherein the one or more moveable mirrors comprise at least one of a single plane mirror, a dual plane mirror, or a polygon mirror.

4. The LiDAR system of claim 2, further comprising a second controller configured to adjust a movement speed of at least one of the one or more mirrors based on the optical path.

5. The LiDAR system of claim 1, wherein the receiver system further comprises an optical lens configured to direct the return pulses to the detector array.

6. The LiDAR system of claim 5, wherein the detector array is positioned at or near a focal plane of the optical lens.

7. The LiDAR system of claim 1, wherein the first controller is configured to selectively activate the subset of the detector segments based on registration signals provided by one or more controllers of the beam steering system, the registration signals being corresponding to angles associated with the optical path within the FOV.

8. The LiDAR system of claim 1, further comprising a third controller configured to control a pulse repetition rate of the light pulses based on the optical path.

9. The LiDAR system of claim 1, further comprising a fourth controller configured to coordinate at least one of a movement speed associated with the beam steering system and a repetition rate of the light pulses based on the optical path.

10. A method performed by a light detection and ranging (LiDAR) scanning system, comprising:
directing a plurality of light pulses from a laser system to a beam steering system;
steering, by the beam steering system, a light pulse of the plurality of light pulses along an optical path within a field of view (FOV);
selectively activating a subset of detector segments of a detector array comprising a plurality of detector segments based on the optical path;
detecting a return pulse by the activated subset of detector segments; and
processing the return pulse detected by the activated subset of detector segments.

11. The method of claim 10, wherein the beam steering system comprises one or more moveable mirrors.

12. The method of claim 10, further comprising:
adjusting a movement speed of at least one of the one or more mirrors based on the optical path.

13. The method of claim 10, wherein selectively activating the subset of detector segments comprises:
selectively activating the subset of the detector segments based on registration signals provided by one or more controllers of the beam steering system, the registration signals being corresponding to angles associated with the optical path within the FOV.

14. The method of claim 10, further comprising controlling a repetition rate of the light pulses based on the optical path.

15. The method of claim 10, further comprising coordinating at least one of a movement speed associated with the beam steering system and a repetition rate of the light pulses based on the optical path.

16. A light detection and ranging (LiDAR) system, comprising:
a beam steering system;
a laser system configured to emit light pulses that are steered by the beam steering system such that each emitted light pulse is steered along an optical path within a field of view (FOV);
a receiver system configured to receive return pulses from the FOV, the receiver system comprising:
a multi-lens array associated with a plurality of windows within the FOV, wherein at least two windows of the plurality of windows overlap each other, and
a plurality of detectors configured to receive return pulses directed by the multi-lens array; and
a controller configured to:
filter out received return pulses that are not captured by the at least two overlapping windows to produce a filtered signal.

17. The LiDAR system of claim 16, wherein the multi-lens array comprises a plurality of optical lenses arranged such that each lens is associated with a window of the plurality of windows within the FOV.

18. The LiDAR system of claim 17, wherein each window of the plurality of windows corresponds to an optical lens of the plurality of optical lenses, each window overlapping with at least one another window corresponding to at least one another optical lens.

19. The LiDAR system of claim 17, wherein the plurality of optical lenses are arranged to emphasize detection of return pulses within a region of interest (ROI) and deemphasize detection of return pulses outside of the ROI.

20. The LiDAR system of claim 17, wherein each one of the plurality of detectors corresponds to one of the plurality of optical lenses.

21. The LiDAR system of claim 16, wherein the at least two windows overlap each other at a minimum distance within the FOV.

22. The LiDAR system of claim 16, wherein the plurality of windows are arranged in an one-dimensional or two-dimensional array.

23. The LiDAR system of claim 16, wherein at least one of the plurality of windows has a different size from other windows.

24. A method performed by a light detection and ranging (LiDAR) system, comprising:
directing, by a laser system, a plurality of light pulses to a beam steering system;
steering, by the beam steering system, a light pulse of the plurality of light pulses along an optical path within a field of view (FOV);
receiving return pulses from the FOV via a multi-lens array associated with a plurality of windows within the FOV, wherein at least two windows of the plurality of windows overlap each other;

receiving, by a plurality of detectors, the return pulses directed by the multi-lens array; and filtering out received return pulses that are not captured by the at least two overlapping windows to produce a filtered signal.

25. The method of claim 24, wherein each window of the plurality of windows corresponds to an optical lens of the multi-lens array having a plurality of optical lenses, each window overlapping with at least one another window corresponding to at least one another optical lens.

26. The method of claim 24, wherein the multi-lens array comprises a plurality of optical lenses arranged to emphasize detection of return pulses within a region of interest (ROI) and deemphasize detection of return pulses outside of the ROI.

27. The method of claim 24, wherein the at least two windows overlap each other at a minimum distance within the FOV.

28. A light detection and ranging (LiDAR) system, comprising:

a laser transmission and steering system configured to transmit light pulses along transmission paths within a field of view (FOV); and a receiver system configured to receive return pulses from the FOV, the receiver system comprising:

a plurality of optical lens and detector combinations (ODC), wherein at least two different ODCs are associated with overlapping windows and process a return pulse from a same object within the FOV; and a controller operative to:

filter out received return pulses that do not correspond to the same object being processed by the at least two ODCs.

29. The LiDAR system of claim 28, wherein at least one of the return pulses is received along a reception path that is different from any of the transmission paths.

30. The LiDAR system of claim 28, wherein each ODC comprises an optical lens and a detector.

31. The LiDAR system of claim 28, wherein the light pulses are transmitted from a first location on a vehicle, wherein each of the plurality of ODCs are located at respective different locations on the vehicle.

* * * * *